(12) United States Patent
Chaturvedi et al.

(10) Patent No.: US 12,099,808 B2
(45) Date of Patent: Sep. 24, 2024

(54) METHOD AND SYSTEM FOR AUTOMATICALLY PRIORITIZING CONTENT PROVIDED TO A USER

(71) Applicant: OrangeDot, Inc., Santa Monica, CA (US)

(72) Inventors: Akhil Chaturvedi, Santa Monica, CA (US); Setu Shah, Santa Monica, CA (US); Watson Xi, Santa Monica, CA (US); Nicole Taylor, Santa Monica, CA (US); Prathamesh Kulkarni, Santa Monica, CA (US)

(73) Assignee: OrangeDot, Inc., Santa Monica, CA (US)

( * ) Notice: Subject to any disclaimer, the term of this patent is extended or adjusted under 35 U.S.C. 154(b) by 0 days.

(21) Appl. No.: 18/143,912

(22) Filed: May 5, 2023

(65) Prior Publication Data
US 2023/0367969 A1 Nov. 16, 2023

Related U.S. Application Data

(60) Provisional application No. 63/412,166, filed on Sep. 30, 2022, provisional application No. 63/340,637, filed on May 11, 2022.

(51) Int. Cl.
*G06F 40/30* (2020.01)
*G06F 16/2457* (2019.01)
(Continued)

(52) U.S. Cl.
CPC .......... *G06F 40/30* (2020.01); *G06F 16/2457* (2019.01); *G06F 16/3329* (2019.01);
(Continued)

(58) Field of Classification Search
None
See application file for complete search history.

(56) References Cited

U.S. PATENT DOCUMENTS

| 4,845,323 A | 7/1989 | Beggs |
| 6,356,940 B1 | 3/2002 | Short |

(Continued)

FOREIGN PATENT DOCUMENTS

| CN | 101600008 A | 12/2009 |
| JP | 2003339674 | 12/2003 |

(Continued)

OTHER PUBLICATIONS

Major Smith, Virginia, et al., "Work Time Interference With Family, and Psychological Distress", 2002, Journal of Applied Psychology, vol. 87, No. 3, 427-436 (Year: 2002)., Feb. 21, 2018 00:00:00.0.

(Continued)

*Primary Examiner* — Richard Z Zhu
(74) *Attorney, Agent, or Firm* — Jeffrey Schox; Ivan Wong

(57) ABSTRACT

In variants, a system for automatically prioritizing content provided to a user can include and/or interface with any or all of: a set of content, a set of models, a set of processing and/or computing subsystems, and a set of messaging platforms and/or messaging interfaces. In variants, a method for automatically prioritizing content provided to a user can include receiving inputs from a set of users and/or processing the set of inputs to determine a set of content recommendations. The method can optionally further include providing content recommendations to a user and/or training and/or updating a set of models.

14 Claims, 15 Drawing Sheets

(51) Int. Cl.
*G06F 16/332* (2019.01)
*G10L 15/18* (2013.01)
*G06F 16/33* (2019.01)

(52) U.S. Cl.
CPC ...... *G10L 15/1815* (2013.01); *G10L 15/1822* (2013.01); *G06F 16/24575* (2019.01); *G06F 16/24578* (2019.01); *G06F 16/3347* (2019.01); *G06F 16/3349* (2019.01)

(56) References Cited

U.S. PATENT DOCUMENTS

| | | | |
|---|---|---|---|
| 6,827,670 | B1 | 12/2004 | Stark et al. |
| 7,188,151 | B2 | 3/2007 | Kumar et al. |
| 7,246,677 | B2 | 7/2007 | Fredriksson et al. |
| 7,248,677 | B2 | 7/2007 | Randall et al. |
| 7,337,158 | B2 * | 2/2008 | Fratkina ............... G06F 16/954 |
| | | | 706/45 |
| 7,376,700 | B1 | 5/2008 | Clark et al. |
| 7,584,166 | B2 | 9/2009 | Grichnik |
| 7,761,309 | B2 | 7/2010 | Sacco et al. |
| 7,818,185 | B2 | 10/2010 | Bjorner et al. |
| 8,160,901 | B2 | 4/2012 | Heywood et al. |
| 8,265,955 | B2 | 9/2012 | Michelson et al. |
| 8,398,538 | B2 | 3/2013 | Dothie et al. |
| 8,500,635 | B2 | 8/2013 | Zilca et al. |
| 8,684,922 | B2 | 4/2014 | Tran |
| 8,726,195 | B2 | 5/2014 | Bill |
| 9,129,227 | B1 * | 9/2015 | Yee ........................ G06N 3/047 |
| 9,286,442 | B2 | 3/2016 | Csoma et al. |
| 9,294,403 | B2 | 3/2016 | Mejia et al. |
| 9,684,922 | B2 | 6/2017 | Elberbaum |
| 10,741,285 | B2 | 8/2020 | Moturu et al. |
| 11,100,179 | B1 | 8/2021 | Zhou et al. |
| 11,386,890 | B1 * | 7/2022 | Fan ........................ G06F 40/30 |
| 11,409,752 | B1 * | 8/2022 | Qadrud-Din .......... G06F 40/126 |
| 11,556,843 | B2 * | 1/2023 | Backas ................... H04L 51/02 |
| 11,868,384 | B2 * | 1/2024 | Shah ..................... G06F 16/338 |
| 2002/0198473 | A1 | 12/2002 | Kumar et al. |
| 2003/0119794 | A1 | 6/2003 | Bacaner et al. |
| 2004/0078223 | A1 | 4/2004 | Sacco et al. |
| 2004/0225340 | A1 | 11/2004 | Evans |
| 2005/0020903 | A1 | 1/2005 | Krishnan et al. |
| 2005/0055321 | A1 | 3/2005 | Fratkina et al. |
| 2005/0108051 | A1 | 5/2005 | Weinstein |
| 2005/0169446 | A1 | 8/2005 | Randall et al. |
| 2006/0064037 | A1 | 3/2006 | Shalon et al. |
| 2007/0094048 | A1 | 4/2007 | Grichnik |
| 2007/0226012 | A1 | 9/2007 | Salgado et al. |
| 2007/0288266 | A1 | 12/2007 | Sysko et al. |
| 2008/0059570 | A1 | 3/2008 | Bill |
| 2009/0125333 | A1 | 5/2009 | Heywood et al. |
| 2010/0082367 | A1 | 4/2010 | Hains et al. |
| 2010/0179833 | A1 | 7/2010 | Roizen et al. |
| 2010/0203876 | A1 | 8/2010 | Krishnaswamy |
| 2010/0280838 | A1 | 11/2010 | Bosworth et al. |
| 2011/0009715 | A1 | 1/2011 | O'Reilly et al. |
| 2011/0066036 | A1 | 3/2011 | Zilca et al. |
| 2011/0118555 | A1 | 5/2011 | Dhumne et al. |
| 2011/0119212 | A1 | 5/2011 | De et al. |
| 2011/0184250 | A1 | 7/2011 | Schmidt et al. |
| 2012/0053425 | A1 | 3/2012 | Michelson et al. |
| 2012/0143013 | A1 | 6/2012 | Davis et al. |
| 2012/0221357 | A1 | 8/2012 | Krause et al. |
| 2012/0289791 | A1 | 11/2012 | Jain et al. |
| 2013/0004129 | A1 | 1/2013 | Zhang |
| 2013/0041290 | A1 | 2/2013 | Kording et al. |
| 2013/0042116 | A1 | 2/2013 | Sakumoto |
| 2013/0085758 | A1 | 4/2013 | Csoma et al. |
| 2013/0095459 | A1 | 4/2013 | Tran |
| 2013/0117040 | A1 | 5/2013 | James et al. |
| 2013/0154838 | A1 | 6/2013 | Alameh et al. |
| 2013/0179178 | A1 | 7/2013 | Vemireddy et al. |
| 2013/0246330 | A1 | 9/2013 | Son et al. |
| 2013/0297536 | A1 | 11/2013 | Almosni et al. |
| 2014/0039914 | A1 | 2/2014 | Dansereau et al. |
| 2016/0019301 | A1 * | 1/2016 | Goldenstein .......... G06F 16/248 |
| | | | 707/722 |
| 2016/0317781 | A1 | 11/2016 | Proud |
| 2017/0099242 | A1 | 4/2017 | Gupta |
| 2017/0212916 | A1 * | 7/2017 | Albert ................... H04L 51/212 |
| 2019/0349321 | A1 * | 11/2019 | Cai ......................... G06N 3/006 |
| 2020/0097814 | A1 * | 3/2020 | Devesa ................ G10L 15/1815 |
| 2020/0151254 | A1 * | 5/2020 | Wohlwend ............ G06F 40/284 |
| 2020/0211709 | A1 * | 7/2020 | Devesa ................... G16H 40/20 |
| 2020/0285705 | A1 * | 9/2020 | Zheng ..................... G06F 40/30 |
| 2020/0356627 | A1 * | 11/2020 | Pablo .................... G06F 40/295 |
| 2020/0372106 | A1 | 11/2020 | Liu et al. |
| 2021/0019648 | A1 * | 1/2021 | Backas ................... H04L 51/02 |
| 2021/0117623 | A1 * | 4/2021 | Aly ....................... G06N 3/045 |
| 2021/0173874 | A1 | 6/2021 | Giddings et al. |
| 2021/0182328 | A1 | 6/2021 | Rollings et al. |
| 2022/0156298 | A1 | 5/2022 | Mahmoud et al. |
| 2023/0096118 | A1 * | 3/2023 | Ramsl .................... G06F 40/30 |
| | | | 707/736 |

FOREIGN PATENT DOCUMENTS

| | | |
|---|---|---|
| JP | 2010514497 A | 5/2010 |
| WO | 2008085308 A1 | 7/2008 |
| WO | 2008096634 A1 | 8/2008 |
| WO | 2012025622 A2 | 3/2012 |
| WO | 2013042116 A1 | 3/2013 |
| WO | 2015003247 A1 | 1/2015 |

OTHER PUBLICATIONS

Thomee, Sara, et al., "Mobile phone use and stress, sleep disturbances, and symptoms of depression among young adults—a prospective short study", BMC Public Health, Biomed Central, London, GB, vol. 11, No. 1, Jan. 31, 2011, p. 66.

Yen, Cheng-Fang, et al., "Symptoms of problematic cellular phone use, functional impairment and its association with depression among adolescents in Southern Taiwan", Journal of Adolescence, Academic Press, Amsterdam, NL, vol. 32, No. 4, Aug. 1, 2009, pp. 863-873.

* cited by examiner

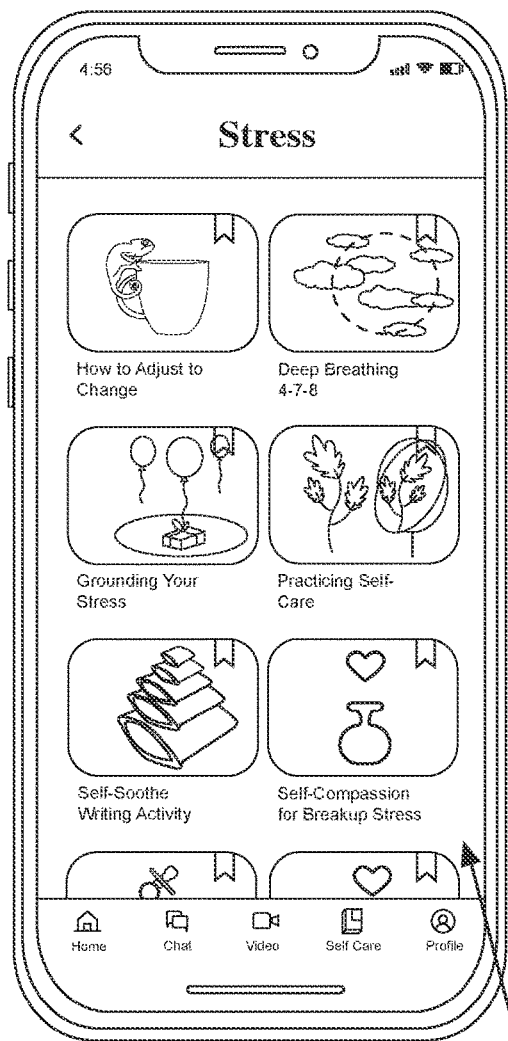
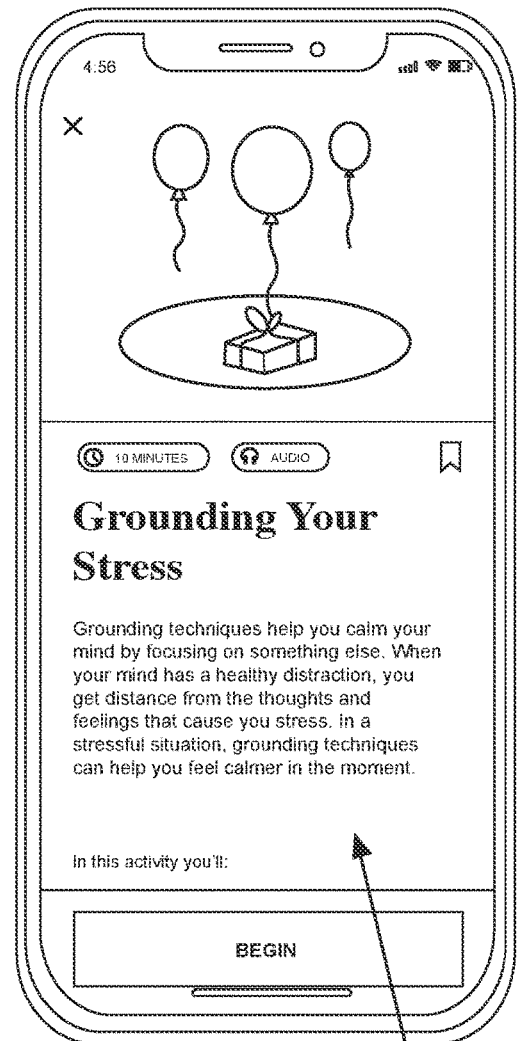
Example content cards displayed at application
Example piece of content
FIGURE 3B
FIGURE 3C

Conversation Snippet

"<COACH>: So last session, we began to talk. Little about the nature of your anxiety and also some of the boundaries that you desire to create in your life, as well as what's not working as far as boundaries go.",
<MEMBER>: Yes, I had moved to a new project at work this week and everything has been ok so far but one thing I notice is that I am ok talking with my peers ( less anxiety) but when I talk with my managers I get really really nervous and mind goes blank",
<MEMBER>: This happens less often in social settings, I do still get nervous talking to ppl but it's less intense outside of work'.
<MEMBER>: Could be because back home in, social settings is very hierarchical, and I kind of bring the mindset to my day to day interactions at work',
<MEMBER>: I feel like sometimes I care so much about formalities that I forget what I'm trying to convey',
"<COACH>: I sounds like it can be very nerve-wrecking to have to talk with superiors, and it also sounds like you've had that mindset as well growing up in, as it's apart of the social environment.",
<MEMBER>: I don't think I talk with my managers as often as other people in my position.',
<MEMBER>: I kind of avoid it, which I am not sure is good for my professional growth',
<MEMBER>: And if I have to do it I just force myself to get it over with and maybe remind myself this is just part of the job'.

S200

|  | Top content card predictions |
|---|---|
| category | card_title |
| relaxation | Anxiety Cues: Becoming Aware |
| thoughts | Managing Worry |
| job-anxiety | The Stress of a New Job |
| relaxation | Counting Breaths to Reduce Anxiety |
| job-anxiety | Three Communication Styles |
| job-anxiety | Asking for What you Need |

FIGURE 5

METHOD AND SYSTEM FOR AUTOMATICALLY PRIORITIZING CONTENT PROVIDED TO A USER

CROSS-REFERENCE TO RELATED APPLICATIONS

This application claims the benefit of U.S. Provisional Application No. 63/340,637 filed 11 May 2022 and U.S. Provisional Application No. 63/412,166 filed 30 Sep. 2022, each of which is incorporated in its entirety by this reference.

TECHNICAL FIELD

This invention relates generally to the digital health and/or remote coaching and/or remote therapy fields, and more specifically to a new and useful system and method for automatically prioritizing content provided to a user in the digital health and/or remote coaching and/or remote therapy fields.

BRIEF DESCRIPTION OF THE FIGURES

FIGS. 3A-3D depict illustrative examples of content provided to a user.

FIG. 5 depicts an illustrative example of a portion of a method for automatically prioritizing content provided to a user.

DETAILED DESCRIPTION

The following description of the embodiments of the invention is not intended to limit the invention to these embodiments, but rather to enable any person skilled in the art to make and use this invention.

1. Overview

Figure 1A:
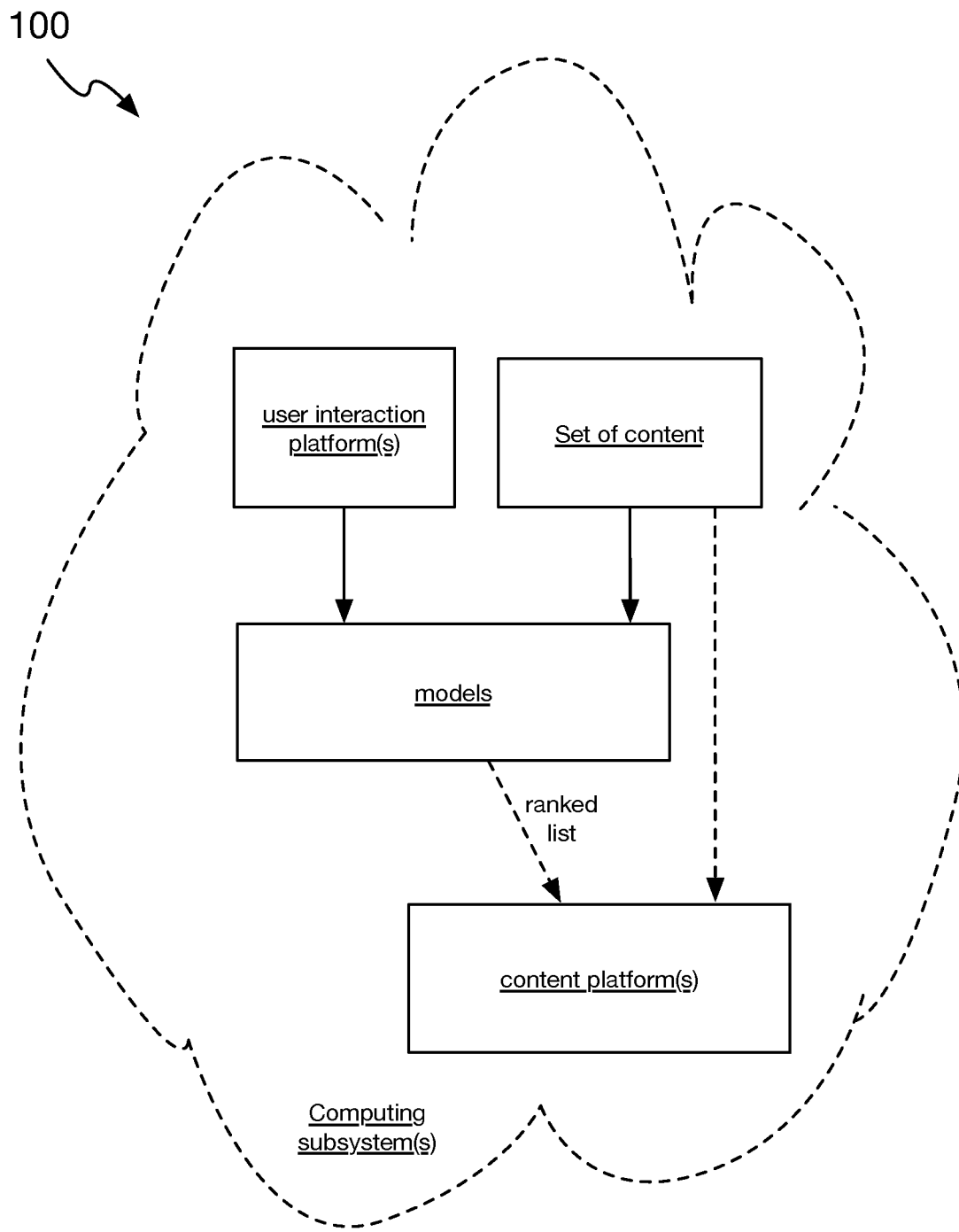
FIGS. 1A-1B are schematic representations of a first and second embodiment, respectively, of a system for automatically prioritizing content provided to a user.
Figure 1B:
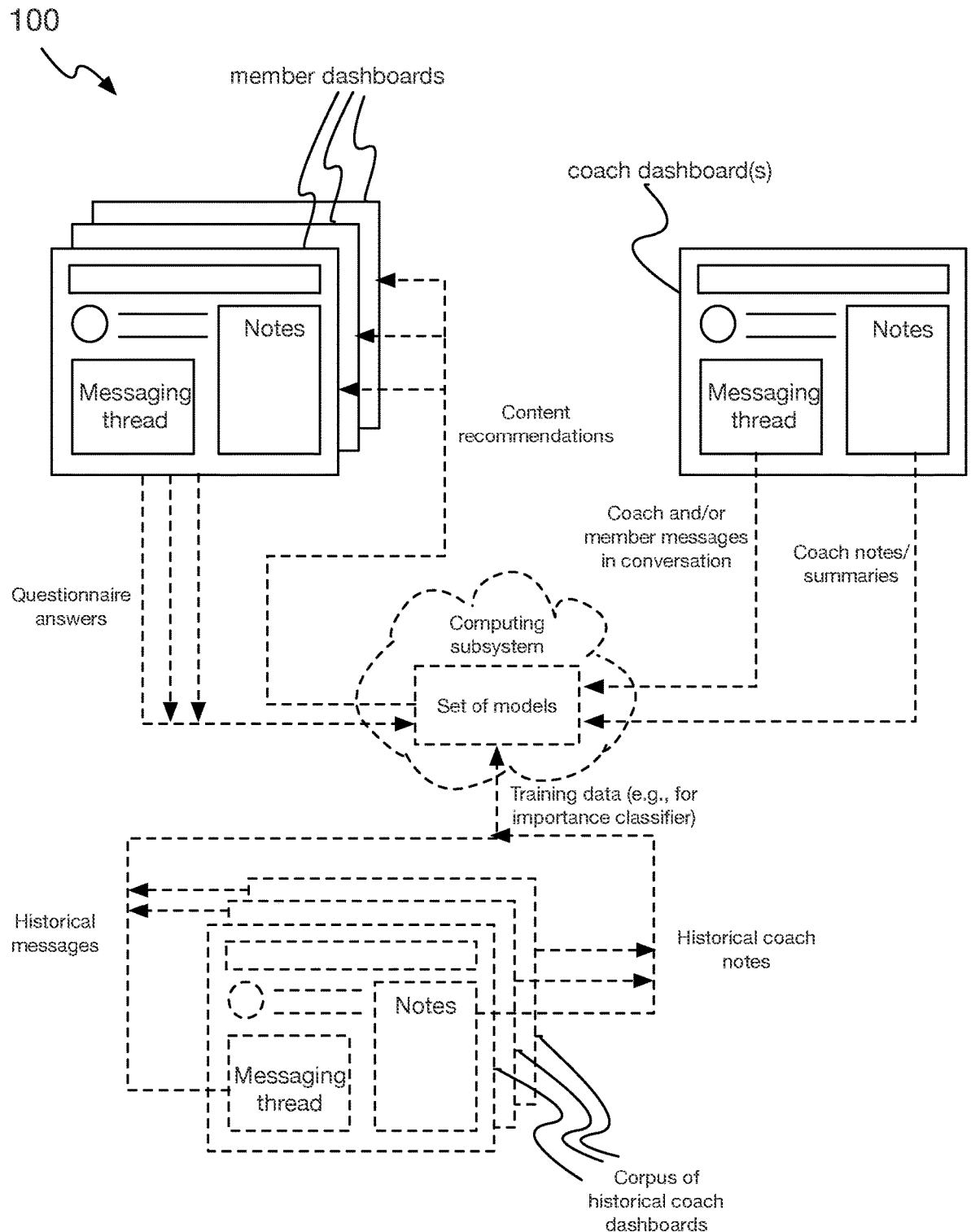

A system 100 for automatically prioritizing content provided to a user can include and/or interface with any or all of: a set of content, a set of models, a set of processing and/or computing subsystems, and a set of user interaction platforms (e.g., messaging platforms and/or messaging interfaces, notes platforms/interfaces such as session documentation platforms and/or session documentation interfaces, etc.) such as text input platforms, and/or a set of content platforms (e.g., platforms configured to enable receipt of user content requests, delivery of content blocks to a user, user interaction with content blocks, etc.), such as shown by way of examples in FIGS. 1A-1B. Additionally or alternatively, the system can include any other suitable components. Further additionally or alternatively, the system 100 can include and/or interface with any or all of the systems, components, embodiments, and/or examples described in any or all of: U.S. application Ser. No. 13/969, 349, filed 16 Aug. 2013; U.S. application Ser. No. 14/839, 053, filed 28 Aug. 2015; U.S. application Ser. No. 14/839, 232, filed 28 Aug. 2015; U.S. application Ser. No. 15/005, 923, filed 25 Jan. 2016; U.S. application Ser. No. 15/069, 163, filed 14 Mar. 2016; U.S. application Ser. No. 15/265, 454, filed 14 Sep. 2016; U.S. application Ser. No. 15/482, 995, filed 10 Apr. 2017; and/or U.S. application Ser. No. 18/189,526, filed 24 Mar. 2023; each of which is incorporated herein in its entirety by this reference.

Figure 2:
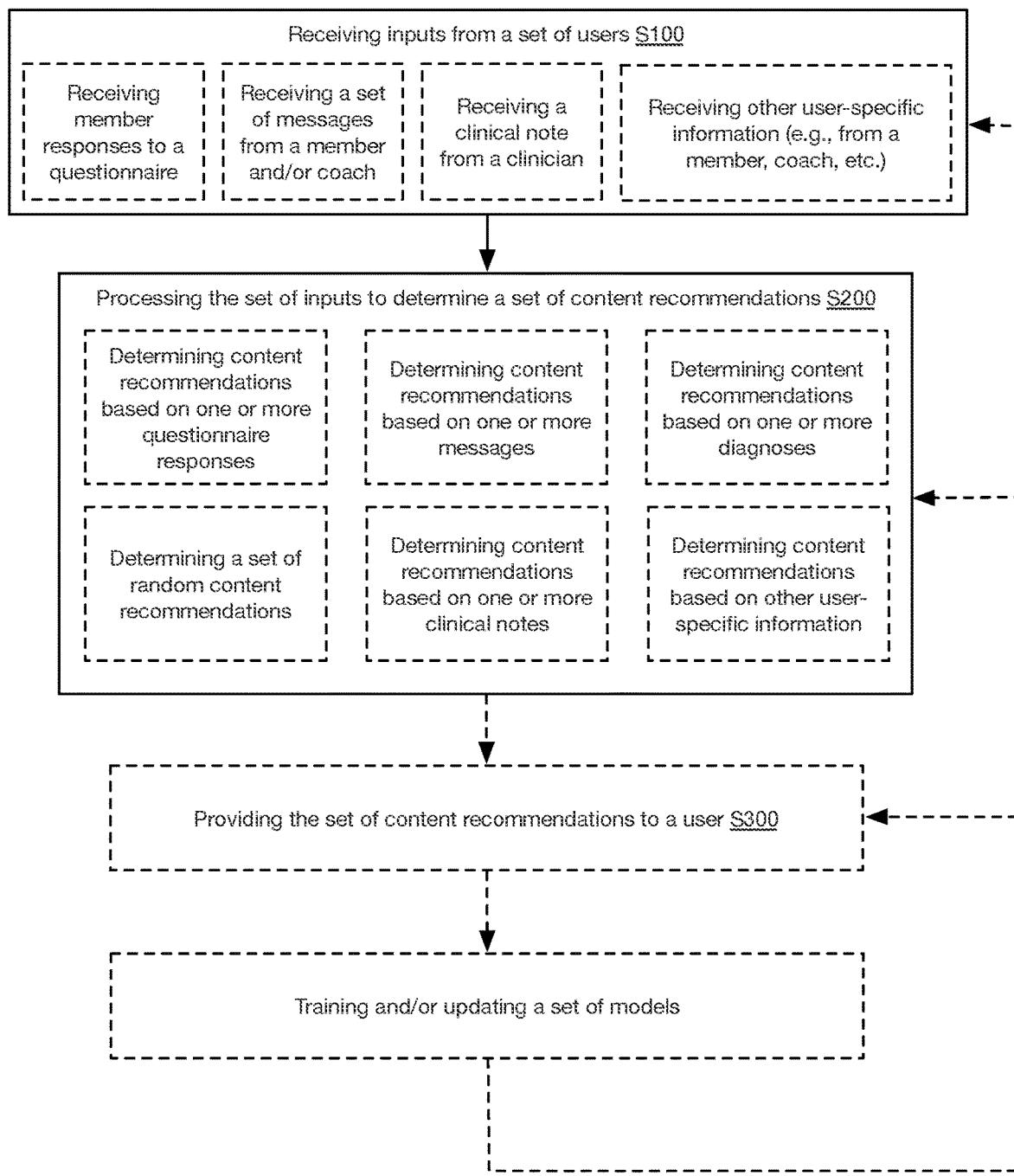
FIG. 2 is a schematic representation of a method for automatically prioritizing content provided to a user.
Figure 3A:
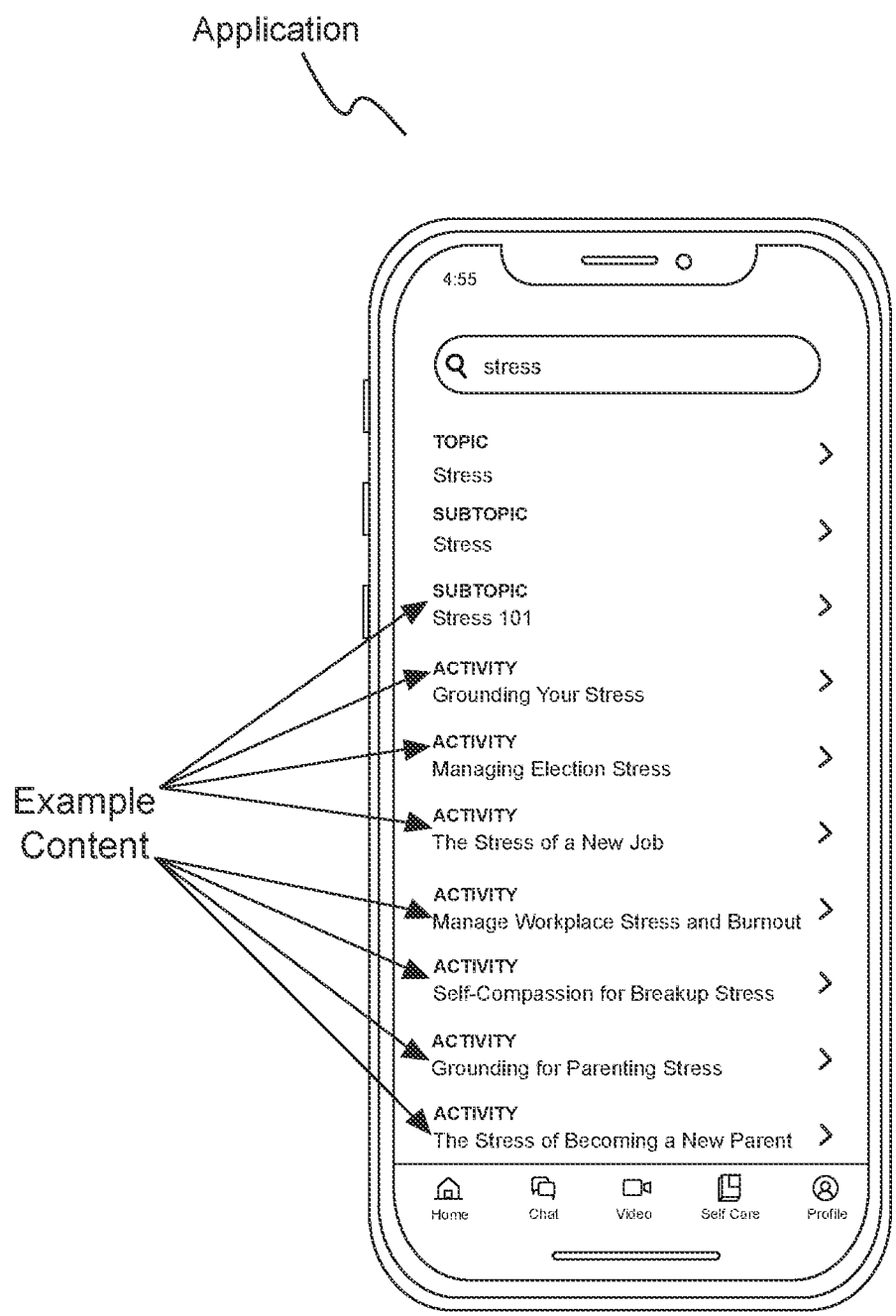
Figure 3D:
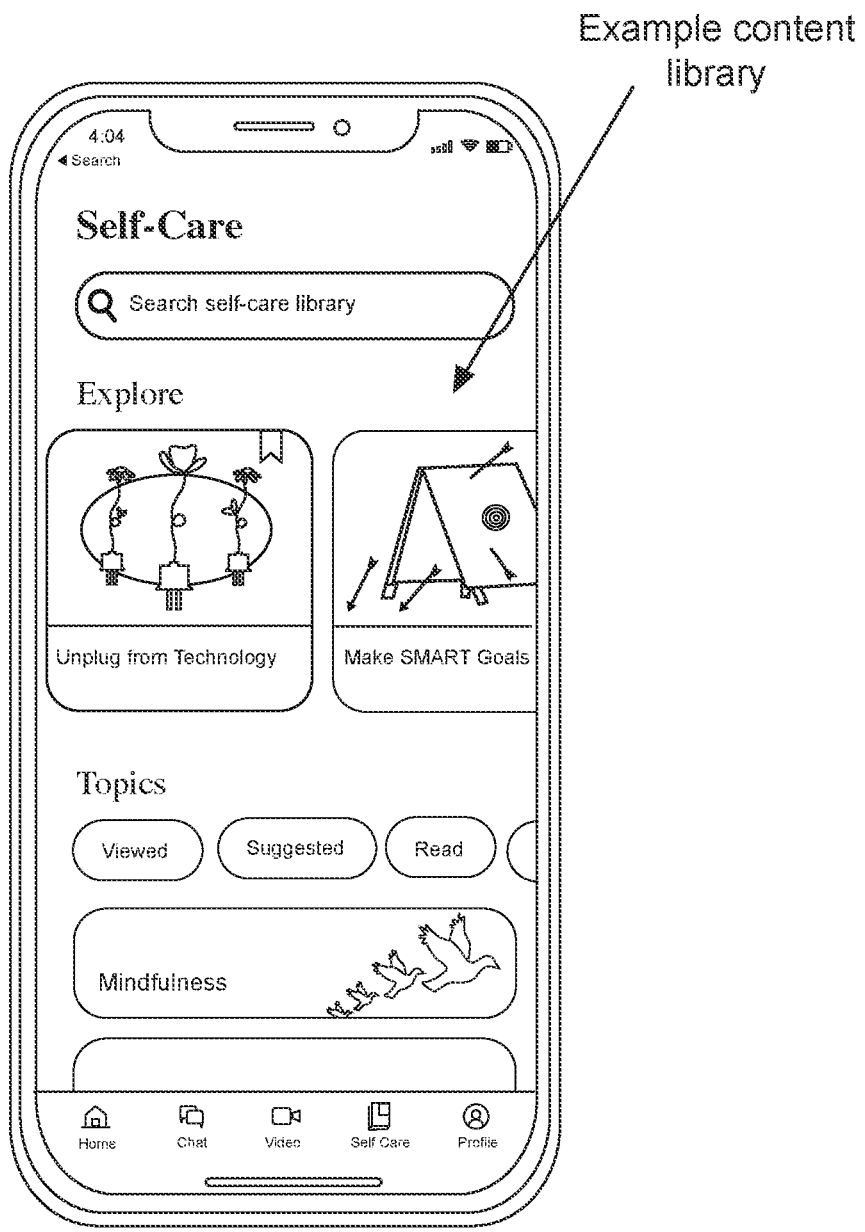

A method 200 for automatically prioritizing content provided to a user includes receiving inputs from a set of users S100 and processing the set of inputs to determine a set of content recommendations S200 (e.g., as shown in FIG. 2). Additionally or alternatively, the method 200 can optionally include providing content recommendations to a user S300, training and/or updating a set of models, and/or any other suitable elements. Additionally or alternatively, the method 200 can include and/or interface with any or all of the methods, processes, embodiments, and/or examples as described in any or all of: U.S. application Ser. No. 13/969, 349, filed 16 Aug. 2013; U.S. application Ser. No. 14/839, 053, filed 28 Aug. 2015; U.S. application Ser. No. 14/839, 232, filed 28 Aug. 2015; U.S. application Ser. No. 15/005, 923, filed 25 Jan. 2016; U.S. application Ser. No. 15/069, 163, filed 14 Mar. 2016; U.S. application Ser. No. 15/265, 454, filed 14 Sep. 2016; and U.S. application Ser. No. 15/482,995, filed 10 Apr. 2017; each of which is incorporated in its entirety by this reference, or any other suitable processes performed in any suitable order.

The method 200 can be performed with a system as described above and/or any other suitable system.

2. Technical Advantages

The system and method for automatically prioritizing content provided to a user can confer several technical advantages over current systems and methods.

Variants of the technology can improve the experience of users taking part in a remote coaching and/or remote messaging experience, such as those taking part in a digital health coaching platform, through the ability to dynamically provide relevant content recommendations to the users. In some such variants, the technology can enable providing more relevant content recommendations (e.g., emotionally-relevant content; clinically-relevant content; content more likely to produce positive outcomes for a user such as improve a user's mental and/or physical health, well-being, and/or mood; etc.), and/or can enable other improvements to digital health coaching and/or other treatments. For example, this can improve member responses to treatment faster and more effectively, with lower relapse rates.

In examples, for instance, a content-based recommendation algorithm allows for dynamic recommendations to be automatically provided to users based on information gathered during the course of coaching sessions and based on messages exchanged between the user and his coach(es), which provides highly dynamic, accurate, and personal information reflective of the user's current state and needs. As such, the content recommendations (and digital program as a whole) are able to keep up with the member's journey and adapt accordingly, which can further function to: improve and/or optimize member satisfaction with the digital program, reduce member churn and frustrations (e.g., due to feeling that the digital program is not suited to their particular states and/or circumstances, etc.), and/or otherwise increase success and impact of the digital program.

In a particular specific example, for instance, the technology enables members to get new, personalized content every time they have a new conversation with a coach (e.g., during and/or after the conversation).

Variants of the technology can additionally or alternatively increase a scalability associated with a digital program through the ability to automatically (e.g., without human input) and dynamically provide personalized content recommendations to a corpus of members in the digital program.

Variants of the technology can additionally or alternatively function to determine and/or provide high-quality content recommendations for users (e.g., individualized recommendations catered to the specific needs and/or desires of each individual user, such as emotionally relevant content recommendations, clinically relevant content recommendations, etc.), and/or can confer other improvements to digital health coaching and/or other treatments. For example, this can improve member responses to treatment, such as enabling faster and/or more effective treatment, and/or treatment resulting in lower relapse rates.

Variants of the technology can additionally or alternatively enable standardization of care provided across multiple languages. While traditional systems and methods for providing therapy and coaching are rooted in a language-specific context, variants of the present system can determine semantic embeddings of user conversations and/or other user-specific text, where the same message in different languages can be mapped to a similar vector representation. In addition, by leveraging messages and/or other user-specific text in multiple languages, the system can optionally generate content recommendations for users in one language by leveraging data of both the same language and other languages (e.g., thereby expanding the capacity of the system to serve users in languages that otherwise could not be served, such as if adequate data has not yet been obtained for that specific language).

Variants of the technology can additionally or alternatively confer one or more technical advantages that improve the functioning of a computer and/or are necessarily rooted in computer technology, such as, but not limited to, any or all of the following.

First, some such variants can include determining and/or providing high-quality content recommendations for users, such as automatically selecting high-quality content recommendations from a large selection of possible content options (e.g., selecting 1-30 content recommendations, such as selecting 1, 2, 3, 5, 10, or 20 recommendations, from a selection of hundreds or more possible options). Such recommendations can, in some examples, be determined based on one or more user-specific text strings (and/or other user-specific inputs), wherein such user-specific text strings can include: one or more messages (or any suitable portions thereof) in a messaging thread (e.g., based on a single message or portions thereof, based on multiple messages, based on dynamic changes occurring in the message thread, etc.); one or more user interaction notes, such as clinical notes (e.g., therapist or psychiatrist session notes) or coaching notes (e.g., summary of a conversation between a user and a coach such as a mental health coach or wellness coach, etc.) and/or one or more lines, sentences, or other portions thereof; one or more user-provided inputs such as questionnaire responses (e.g., free-text responses to prompts such as "Please tell us why you're seeking clinical services at this time.", "Is there any other information you would like your therapist and/or psychiatrist to know before you see them?", etc.); and/or any other suitable strings. Some or all of these variants are necessarily rooted in computer technology (e.g., as they are rooted in the use of one or more computer-based models, such as one or more embedding models and/or other trained models) and/or confer one or more technical advantages that improve the functioning of a computer (e.g., by improving the quality of content recommendations provided by the computer).

Second, some such variants can additionally or alternatively function to increase the speed with which content recommendations can be provided to a user while still configuring the content to be optimal for the user. For example, content recommendations can be determined (or a determination process can be partially performed) in advance of a user's need for the content recommendations, wherein the results can be stored in a database (e.g., fast-retrieval database) and retrieved upon demand (e.g., in response to receiving a user content request from and/or for the user). Additionally or alternatively, a fast, efficient content recommendation system and/or method can be employed (e.g., including use of an optional importance model to select important user-specific data, a trained embedding model to determine user-specific embeddings based on the user-specific data and/or to determine content embeddings based on the available content, and/or a content selection model that selects content recommendations based on similarities between user-specific embeddings and content embeddings) to enable rapid determination of content recommendations; in some examples, such fast content recommendation determination can enable providing such content recommendations to the user in real- or near-real-time (e.g., such that, during a user interaction with a coach or clinician, the technology can determine relevant content recommendations for the user based on the interaction and provide these relevant content recommendations during the interaction); additionally or alternatively, such efficient content recommendation determination can enable use of fewer computing resources and/or determination of user-specific content recommendations for larger numbers of user.

Third, some such variants can additionally or alternatively function to reduce memory requirements by employing a single embedding model for determining embeddings of multiple different inputs, such as for determining both user-specific embeddings (e.g., embeddings of user-specific inputs such as text strings) and content embeddings (e.g., embeddings associated with content blocks, such as embeddings of content titles, descriptions, and/or excerpts); additionally or alternatively, a single embedding model (e.g., multi-lingual embedding model, such as a language-agnostic embedding model) may be used for determining embeddings of inputs in multiple languages. In using only a single embedding model for multiple tasks (e.g., determining embeddings of different types of inputs and/or of different language inputs), memory requirements can be reduced as compared with using two (or more) different embedding models (e.g., wherein both/all embedding models would need to be kept in memory to avoid undesirable storage I/O latency from switching between use of the different models). Further, a person of skill in the art will recognize that the use of a particular type of model (e.g., transformer model, embedding model, semantic embedding model, multi-lingual embedding model, etc.) confers specific structural elements to the model used.

Fourth, some such variants can additionally or alternatively function to facilitate automated training of one or more models (e.g., importance models), such as by performing weakly-supervised training using on algorithmically-identified labels (e.g., rather than requiring skilled human intervention to provide high-quality labels). Accordingly, such variants can enable rapid and/or automatic generation of large corpuses of labelled training data for training of one or more models, thereby improving the function of those models (e.g., as compared with training using only a much smaller corpus of training data, such as a corpus limited in size by availability of skilled human intervention) and/or of the training technology (e.g., by automating the rapid generation of such a training data corpus).

Fifth, some such variants can additionally or alternatively employ multiple types of models in a particular arrangement (e.g., wherein one particular type of model feeds into a different particular type of model). For example, the output of an importance model (e.g., model including one or more decision trees, such as a gradient boosted model or random forest including an ensemble of decision trees; any other suitable classifier model) can be provided to an embedding model (e.g., semantic embedding model), and/or the output of the embedding model can be provided to a content selection model (e.g., algorithmic model configured to select content based on semantic similarity to user-specific text strings). In a specific example, a set of inputs are provided to the importance model, the importance model classifies the importance of the inputs (e.g., labels inputs as "important" or "unimportant", scores the importance of the inputs, etc.), and only important inputs (e.g., inputs classified as "important", inputs with an importance score greater than a threshold value, etc.) are then provided to the embedding model; additionally or alternatively, inputs (e.g., all inputs, only important inputs such as determined by the importance model, etc.) are provided to the embedding model, which generates embeddings for each input, and then some or all of these embeddings are provided to the content selection model.

However, the technology (e.g., the system and/or method) can additionally or alternatively confer any other suitable benefits.

3. System

As shown in FIGS. 1A-1B, a system 100 for automatically prioritizing content provided to a user can include and/or interface with any or all of: a set of content, a set of models, a set of processing and/or computing subsystems, and a set of messaging platforms and/or messaging interfaces. Additionally or alternatively, the system can include any other suitable components. Further additionally or alternatively, the system 100 can include and/or interface with any or all of the systems, components, embodiments, and/or examples described in any or all of: U.S. application Ser. No. 13/969,349, filed 16 Aug. 2013; U.S. application Ser. No. 14/839,053, filed 28 Aug. 2015; U.S. application Ser. No. 14/839,232, filed 28 Aug. 2015; U.S. application Ser. No. 15/005,923, filed 25 Jan. 2016; U.S. application Ser. No. 15/069,163, filed 14 Mar. 2016; U.S. application Ser. No. 15/265,454, filed 14 Sep. 2016; U.S. application Ser. No. 15/482,995, filed 10 Apr. 2017; and/or U.S. application Ser. No. 18/189,526, filed 24 Mar. 2023; each of which is incorporated herein in its entirety by this reference.

The system 100 preferably functions to automatically provide personalized content to any or all users participating in a digital platform (e.g., digital health platform remote communication platform, etc.), such that the content accurately reflects and adapts to the current state (e.g., mental health state) and/or needs of the user. Additionally or alternatively, the system 100 can perform any other functions.

One or more instances of the system (e.g., response recommendation system instances) can be used for different: user classes, demographics, languages, pathologies, response corpuses, timeframes, and/or otherwise differing populations (and/or any other suitable populations). Alternatively, the same system instance can be used for all users and respondents (and/or for any other suitable subsets thereof).

The system preferably interfaces with a set of users, wherein in preferred variations, the set of users refers to both a care team and participants (equivalently referred to herein as members). The care team (equivalently referred to herein as care providers) includes the individuals and/or entities (e.g., humans, bots, etc.) involved in the coaching and/or care of the participant within a messaging platform (e.g., digital health platform, digital mental health platform, digital coaching platform, digital therapy platform, etc.) and can include any or all of: coaches, supervisors (e.g., who supervise coaches, who supervise clinicians, etc.), clinicians (e.g., therapists, psychiatrists, psychologists, physicians, specialists, clinically-trained coaches, etc.), member support persons (e.g., who are involved in supporting the care team members and/or participants, technical support persons, etc.), guardians (e.g., parent, spouse, legal guardian, medical power of attorney, etc.), and/or any other individuals and/or entities. The set of participants (equivalently referred to herein as members and/or patients) preferably refers to individuals partaking in the platform (referred to herein as "receiving care") (e.g., receiving coaching, receiving clinical support, etc.), but can additionally or alternatively refer to any other suitable individuals.

Additionally or alternatively, the users can be taking part in messaging outside of any particular platform (e.g., engaging in a native text messaging application on their user device(s)) and/or within any other platforms.

The system can optionally include and/or interface with a set of hubs (equivalently referred to herein as dashboards), wherein the set of hubs preferably functions as user interfaces for any or all of the users, wherein the user interface enables the user to provide and/or receive information (e.g., from other users, from a computing system, etc.). As such, the hubs can include any or all of: a messaging platform (e.g., with which users can exchange information), content (e.g., provided to a participant by his or her coach, provided to a participant automatically, etc.), a notes section, platform, or interface (e.g., for a coach to record and/or share his or her observations of a participant, for a coach to communicate his or her observations to another coach and/or a supervisor and/or a clinician, session documentation platform for a coach to document a messaging session or other interaction with a participant, etc.), and/or any other sections.

In some variations, each of the users is associated with a hub, wherein the types of hubs can include any or all of: a coaching hub for coaches, a supervisor hub for supervisors, a member hub for members (equivalently referred to herein as participants), a clinical hub for clinicians, and/or any other suitable hubs. The hubs can be any or all of: the same (e.g., including the same features, including the same sections, etc.), different, and/or any combination. Additionally or alternatively, the hubs can be otherwise configured.

In preferred variations, any or all of the hubs can be implemented as a client application executable on a user device, wherein the users can log into their respective hubs (e.g., at various devices, at a mobile device, at a desktop device, etc.) through the client application. Each of the hubs is preferably in communication with and/or part of a computing system, preferably a remote computing system, wherein information associated with the hub is updated and/or shared through the remote computing system. Additionally or alternatively, information can be alternatively shared and/or updated.

The care team preferably includes a set of coaches, wherein each of the set of coaches interacts with a set of members, and optionally any or all of his or her: supervisors, member support persons, clinicians (e.g., assigned to the coach, assigned to the member, etc.), and/or any other suitable individuals and/or entities.

In a set of examples, each participant is assigned a set of one or more coaches (e.g., wherein a primary coach is assigned to the member and responsible for communicating with the member while the primary coach is online and a set of backup coaches which can fill in for the primary coach if needed). Additionally or alternatively, the member can be assigned a single coach, a random coach (e.g., depending on when the member and the coach are online), and/or any other suitable coaches. The coach care team is preferably fixed but able to be updated for each member (e.g., in an event that a coach leaves or is matched with a different member, in an event that the member and a coach are not a good fit, etc.), but can additionally or alternatively be randomly determined and/or reassigned (e.g., upon login of the member and based on coaches online) and/or otherwise determined or assigned.

Optionally, the care team further can additionally or alternatively include one or more clinical care team members (e.g., licensed clinicians, therapists, psychiatrists, physicians, specialists, trained coaches, etc.), equivalently referred to herein as clinicians, which can be assigned to (e.g., individually, through a clinician care team, etc.) a particular member or set of members, such as in response to an escalation. The clinicians are preferably able to communicate with members and any or all of the other members of the participant's care team (e.g., coaches, supervisors, other clinicians, etc.), but can additionally or alternatively be otherwise in communication (or not in communication) with one or more users. A person of skill in the art will recognize that the system and/or method can additionally or alternatively typically be employed in an analogous manner in the context in which one or more "coaches" are replaced or supplemented by a clinician, supervisor, and/or any other suitable member(s) of the care team (e.g., although often referred to herein as involving a "coach", any suitable elements of the system and/or method can additionally or alternatively involve a clinician in an analogous manner).

The system 100 preferably includes and/or interfaces with one or more sets of data. Data stored and/or received by the system (e.g., in a data store such as a corpus, database, etc.) can be used to perform any or all other processes of the method. Data can additionally or alternatively be used to evaluate and/or train one or more models. Types of data can include: user data, content data, and/or any other suitable information.

User data (equivalently, "user-specific data") can include coach preferences, member preferences, participant information, provider information, and/or any other suitable information. The user data can include any suitable data (and/or metadata) collected by the system in association with a particular user. Participant information can include: demographics, medical history, past check-in and/or survey responses (equivalently, "questionnaire responses"), any other information provided to the platform by the user, any information uploaded to the platform by another entity on behalf of the user (e.g., notes sent from a medical provider, medical records from a physician's office, information sent by a guardian, etc.), notes taken about the participant by another user (e.g., by the coach, by the care team, by a technical support person, etc.), and/or any other information. Metadata can include platform usage data (e.g., raw data and/or trends), conversation data (e.g., number of messages, number of conversation threads, messaging frequency, etc.), tone, and/or other data. Platform usage data can include: log-in times, log-off times, active times, preferred content, time spent viewing content, time spent engaging in a conversation, and/or any other information. In non-limiting examples, user data can include: user-specific text strings and/or collections thereof (e.g., messages, messaging sessions, coaching notes, clinical notes, user notes, user questionnaire responses such as free-text responses, etc.) and/or other user data (e.g., user questionnaire responses such as selected responses to multiple-choice questions, user-specific images, videos, audio, etc.). User data can additionally or alternatively include user-specific embeddings, such as representations of other user data in one or more embedding spaces (e.g., wherein the embeddings are generated by one or more embedding models).

Content data can include content blocks (e.g., content cards and/or representations thereof), associated information (e.g., content block titles, descriptions, text excerpts, full text content, non-text content such as images, video, audio, interactive content, etc.; content metadata such as content categories, links to clinical diagnoses, popularity, effectiveness, difficulty, estimated time requirement, etc.), and/or any other suitable content-related information. Content data can additionally or alternatively include content embeddings, such as representations of other content data in one or more embedding spaces (e.g., wherein the embeddings are generated by one or more embedding models); content embeddings can share an embedding space and/or embedding model with user-specific embeddings, and/or can utilize different embedding spaces and/or embedding models than the user-specific embeddings.

The system 100 can optionally function to receive, store, and/or process one or more messages (e.g., sent through the platform, sent to the platform, etc.), which may form one or more conversation threads, such as described by way of example in U.S. patent application Ser. No. 18/189,526, filed 24 Mar. 2023 and titled "METHOD AND SYSTEM FOR AUTOMATICALLY DETERMINING RESPONSES IN A MESSAGING PLATFORM", which is herein incorporated in its entirety by this reference. A conversation thread can include a set of one or more messages sent between a set of interacting users (e.g., one or more coaches and one or more members), such as shown by way of examples in FIGS. 5, 6A, 6B, and/or 7. A conversation thread can include a time series of messages, a set of messages, and/or be otherwise constructed. A conversation thread can be for a single session or multiple sessions. A single session can be defined by an active time window (e.g., all messages sent between two or more users within a particular time window, all messages sent within a threshold duration from the prior message, etc.), an elapsed time window (e.g., wherein a conversation thread ends after an elapsed time has passed between subsequent messages), message content (e.g., containing cues indicating the end of a conversation such as "goodbye"), an input (e.g., wherein a care provider presses a button in their hub indicating the end of a conversation), a login session, and/or be otherwise defined. Each conversation thread can include messages sent by senders and received by recipients. Each interacting user can be a sender or recipient, depending on whether the user sent the message or received the message, respectively. The system can support interactions between one or more interacting user sets, and support one or more conversation threads.

The system preferably includes and/or interfaces with a set of content (e.g., including "content blocks", equivalently "pieces of content"), such as a database of content. The content blocks (e.g., informational modules, games, activities, homework, etc.) preferably function to supplement coaching and therapy practices and has the potential to improve both the impact and scalability of these interventions, among other benefits. For instance, while engagement with media and content can be helpful generally, there is a need to personalize the content given the multifaceted nature of mental health (e.g., patient condition, environment, psychosocial stressors). Personalization can help to reduce choice overload, increase digital therapeutic alliance by providing personal recommendations that increase the likelihood the user feels understood, and support users to self-manage mental health and well-being. Further, self-guided content provided as prescribed by the system and/or method can serve as a scalable approach to supplement the mental health journey for users (e.g., reduce stress, improve mental health, reduce fatigue and pain, etc.).

The types of content can include, but is not limited to, any or all of: self-guided psychoeducational content, behavioral exercises, homework activities, and/or any other information that can be therapeutically beneficial to an individual suffering from specific conditions or assist with general mental health and wellbeing. In specific examples, the content can be presented in a variety of formats (e.g., via one or more content platforms), such as, but not limited to: meditations, breathing exercises, videos, podcasts, surveys, and/or readings. Examples of the member interface to view and interact with content are shown in FIGS. 3A-3D.

The set of content can be stored at and/or retrieved from any or all of: a remote computing subsystem (e.g., cloud computing subsystem, cloud server, remote server, etc.), a local computing subsystem, a user device, and/or any other location(s) or combination of locations.

The system 100 preferably includes and/or interfaces with a set of models, wherein the set of models functions to determine a set of automated message responses to be provided to the set of coaches while engaging in conversations with one or more members. Additionally or alternatively, the set of models can produce any other outcomes and/or be otherwise implemented.

The set of models preferably includes one or more trained models. The models can be trained using: semi-supervised learning, weakly-supervised learning, supervised learning, unsupervised learning, reinforcement learning, transfer learning, and/or any other suitable training techniques. The models can include: machine learning models, statistical models, algorithms, rule-based models, decision trees, similarity models (e.g., configured to calculate similarity scores between a set of options), and/or any other suitable models. Examples of models that can be used can include: neural networks, deep learning models (e.g., feed forward neural networks, recurrent neural networks, convolutional neural networks, etc.), language models, autoencoders, support vector machines, Bayesian networks, maximum entropy models, conditional random fields, regression, clustering, nearest neighbors, decision trees, random forests, classifiers, any other machine learning models, and/or any suitable combinations thereof.

In variants, the system 100 can include one or more of: an importance model, an embedding model, and/or a content selection model. However, the system can additionally or alternatively include any other suitable model(s) of any kind(s).

Optionally, the functionality of any of the models described herein can be combined into one or more models (e.g., wherein the embedding model automatically performs importance classification, such as by not generating embeddings for unimportant inputs or by representing importance using one or more dimensions of the embedding space). One or more models can be executed remotely (e.g., on a remote server, on the cloud, etc.), on a local device (user device), and/or otherwise executed.

The system can include one or more models of each type. When the system includes multiple models of the same type and/or functionality (e.g., multiple importance models, multiple embedding models, multiple content selection models, etc.), the system can include a different model for different: geographies, user classes, timeframes, languages, and/or other parameters.

The system 100 can include one or more embedding models, which can function to compress and/or otherwise convert data (e.g., messages, images, audio, video, user data, etc.) into a vector form (e.g., an embedding, a feature vector, etc.). Additionally or alternatively, data can be hashed and/or represented in any other suitable manner. The embedding model can be used: each time data (e.g., a message) is received, prior to storing data (e.g., wherein data is sorted by the system in its embedded form), prior to or after deidentifying the data, when the method is initiated, prior to use of a content selection model, and/or at any other suitable time(s).

In variants, the embedding model can convert the message into a common embedding space (e.g., latent space). The embeddings are preferably semantic embeddings (e.g., that capture the semantic meaning of the message), but can additionally or alternatively include word embeddings and/or string embeddings (e.g., that represent the words and/or strings themselves), pixel embeddings, and/or any other suitable embeddings. In variants, the embeddings can preserve semantic information from the original data. In variants, the embeddings can be multi-lingual (e.g., wherein the embedding model is a multi-lingual semantic embedding model), such as wherein the embeddings are language agnostic (e.g., wherein the same or substantially the same embedding is encoded for the same semantic meaning across languages, wherein embeddings that are substantially the same are understood to have very high cosine similarity, such as cosine similarity greater than 0.6, 0.75, 0.8, 0.85, 0.9, 0.95, 0.98, 0.99, 0.999, etc., across all dimensions of the embedding space, or alternatively across all but a predefined subset of dimensions such as a subset associated with language specificity) or language semi-specific (e.g., wherein a similar embedding is encoded for same semantic meaning across different languages). Alternatively, the embedding can be language specific (e.g., supporting only a single language or set of languages, producing significantly different embeddings for semantically-similar inputs of different languages, etc.). However, the embedding model can additionally or alternatively extract features from the message and/or otherwise represent the message in any other suitable manner.

Embedding models can include one or more: user data embedding models (e.g., embedding model that generates user-specific embeddings, such as based on user-specific text strings), content data embedding models (e.g., embedding model that generates content embeddings, such as based on titles, text descriptions, and/or excerpts from content blocks and/or based on content blocks in their entirety), message importance embedding models (e.g., embedding model that generates sentence embeddings, such as for use in and/or as part of an importance model), and/or any other suitable embedding models. The system preferably includes a single embedding model for generating both user-specific embeddings and content embeddings (and/or for generating any other suitable embeddings). However, the system can optionally include any suitable number of embedding models (e.g., each for generating different kinds of embeddings and/or generating embeddings based on different types of inputs).

The embedding model(s) can be: deterministic (e.g., wherein the model always generates the same embedding given the same input) or nondeterministic (e.g., probabilistic). Example embedding models can include and/or depend on: convolutional neural networks (CNNs), deep neural networks (DNNs), transformer models, generative models, singular value decomposition (SVD), locality sensitive hashing (LSH), principal component analysis (PCA), Word2Vec, BERT, XLM-Roberta, GloVe, large language models (LLMs), recommender systems, encoders (e.g., the encoder portion of an autoencoder trained end-to-end to predict the input message, trained end-to-end to predict a related concept in another language, etc.), all or a subset of the layers from a classifier, and/or any other embedding models or techniques. In variants, the embedding model can be monolingual, multi-lingual (e.g., pseudo cross-lingual, cross-lingual, jointly optimized such as jointly optimized across languages, etc.), and/or otherwise configured. In variants, the embedding model can be trained by the system, but can additionally or alternatively be trained in any other suitable manner (e.g., pre-trained, available publicly and/or commercially as a trained model, etc.); in any such cases, the embedding model may be referred to as a "trained embedding model".

In a first variant (e.g., monolingual training), the embedding model can be trained on monolingual word embeddings on large monolingual corpus of data (e.g., messages). Each word in a language can be mapped into an embedding space unique to that language. Optionally, the model can be subsequently trained to learn a linear mapping between monolingual representations in different languages to enable them to map unknown words from the source language to the target language. Alternative transformations between an embedding space in a first language and an embedding space in a second language can be used.

In a second variant (e.g., pseudo-cross-lingual training), the embedding model can be trained on a pseudo-cross-lingual corpus including mixed contents of different languages.

In a third variant (e.g., cross-lingual training), the embedding model can be trained on a parallel corpus including contexts of different languages. The embedding model can optimize a cross-lingual constraint between embeddings of different languages that encourages close proximity of embeddings of similar words across languages in a shared embedding space (e.g., vector space). In examples, a parallel corpus can be or include: a lexicon, document-aligned data, sentence-aligned data, word-aligned data, and/or any other cross-lingual representation.

In a fourth variant (e.g., joint optimization), the embedding model can be trained on parallel or monolingual data (e.g., messages). The model can be trained to jointly optimize a combination of monolingual and cross-lingual losses.

In some examples, the embedding model can be the same as or similar to the embedding model described in U.S. patent application Ser. No. 18/189,526, filed 24 Mar. 2023 and titled "METHOD AND SYSTEM FOR AUTOMATICALLY DETERMINING RESPONSES IN A MESSAGING PLATFORM", which is herein incorporated in its entirety by this reference; for example, the system can optionally include both the system 100 described herein and the 'system 100' of U.S. patent application Ser. No. 18/189,526 (and/or any suitable elements thereof), wherein the embedding model (and/or any other suitable elements) can optionally be shared between the two, and/or the method can optionally include performing both the method 200 described herein and the 'method 200' of U.S. patent application Ser. No. 18/189,526 (and/or any suitable elements thereof), wherein generating embeddings (and/or performing any other suitable elements) can optionally be performed as part of both of the two (e.g., wherein a single embedding is generated for a particular input in the course of performing both methods).

A person of skill in the art will recognize that the term "embedding space" is commonly used to refer to the vector space (e.g., high-dimensional vector space) used by an embedding model, wherein the embeddings generated by such a model correspond to positions (equivalently, vectors) in this vector space.

However, the embedding model can additionally or alternatively be configured in any other suitable manner.

The importance model is preferably a classifier model (e.g., binary classifier such as classifying between "important" and "unimportant", ranking classifier such as classifying into one of a plurality of importance scores, generative model operable to classify message importance in response to an input providing the message, such as a large language model provided with the message and a request to classify the message's importance, etc.). In some examples, the importance model includes one or more decision trees (e.g., an ensemble of decision trees, such as forming a random forest model or gradient boosted model). However, the importance model can additionally or alternatively have any other suitable structure and/or functionality. In some examples, the importance model includes (and/or is preceded by) an embedding model, such as a universal sentence embedding model; this embedding model can be the same as the embedding model described above, or can be a different embedding model. In some examples, the importance model is trained using weakly-supervised training, wherein training data is labelled algorithmically. In some examples, the importance model can include one or more elements such as described in (and/or be trained and/or used such as described in) Chaturvedi, Akhil, et al. "Content Recommendation Systems in Web-Based Mental Health Care: Real-world Application and Formative Evaluation." *JMIR Formative Research* 7.1 (2023): e38831, which is herein incorporated in its entirety by this reference (e.g., as described in the Appendix thereof). However, the system can additionally or alternatively include any other suitable importance model(s) used in any suitable manner, or may include no such models.

The content selection model is preferably an algorithmic and/or mathematical model. For example, the content selection model can be configured to: determine a similarity matrix (e.g., cosine similarity matrix) between user-specific embeddings and content embeddings; determine a score for each content embedding based on the matrix (e.g., taking the maximum similarity value for each content embedding, preferably given all instances of user embedding and content embedding similarities; taking an average similarity value for each content embedding, preferably given all instances of user embedding and content embedding similarities; etc.); and sort the content embeddings into a ranked list based on the scores (e.g., wherein the content embedding with the highest score, corresponding to the greatest similarity, is placed at the start of the ranked list). Further, the content selection model may optionally be configured to combine recommendations from multiple sources (e.g., predetermined recommendations associated with clinical diagnoses and dynamically generated recommendations determined based on user-specific text strings), such as described below regarding S200 (e.g., regarding using clinical notes as inputs). However, the system can additionally or alternatively include any other suitable content selection model(s) used in any suitable manner.

Figure 8A:
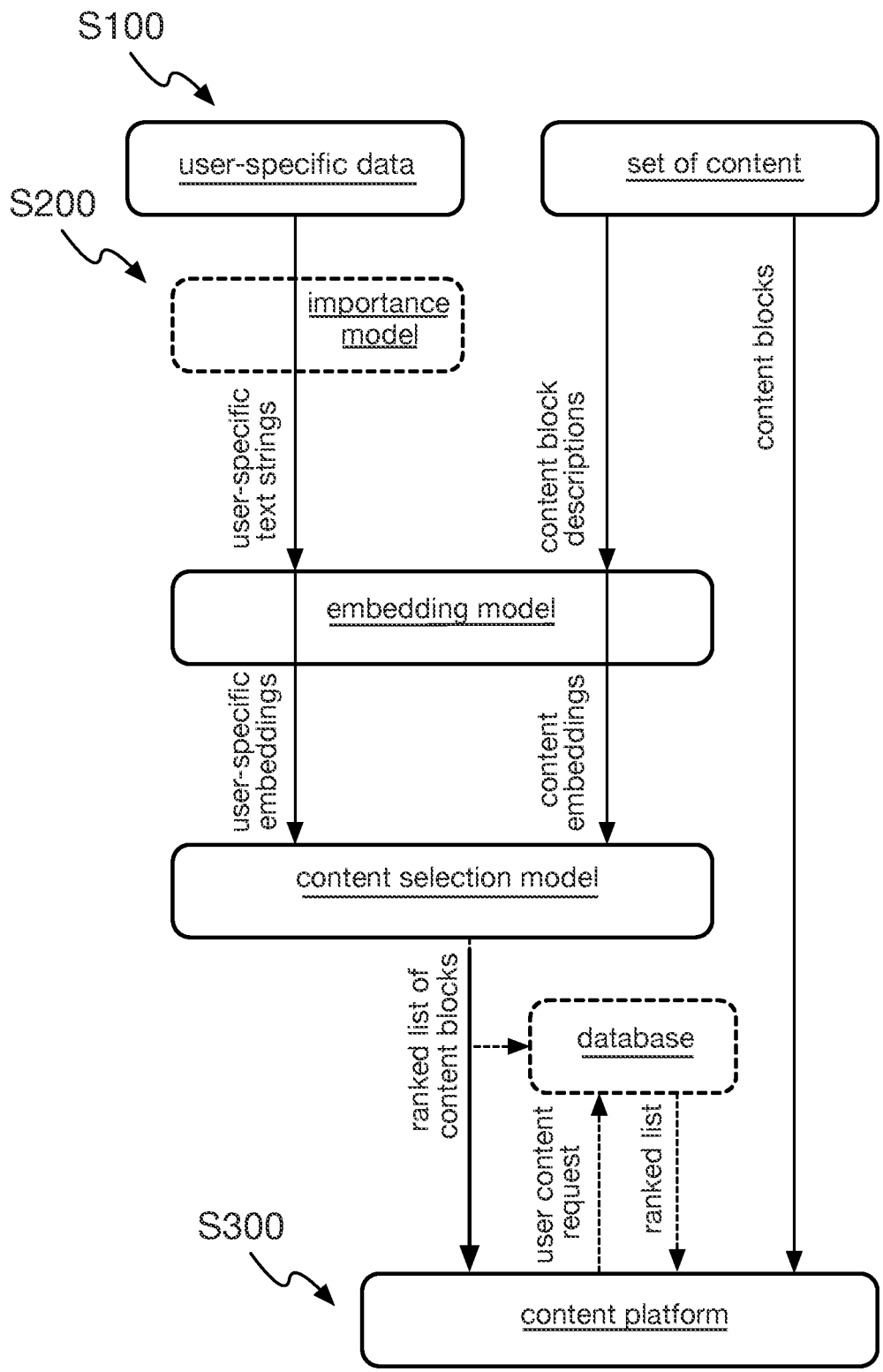
FIGS. 8A-8B are schematic representations of a first and second example, respectively, of a portion of a first embodiment of the system and method.
Figure 8B:
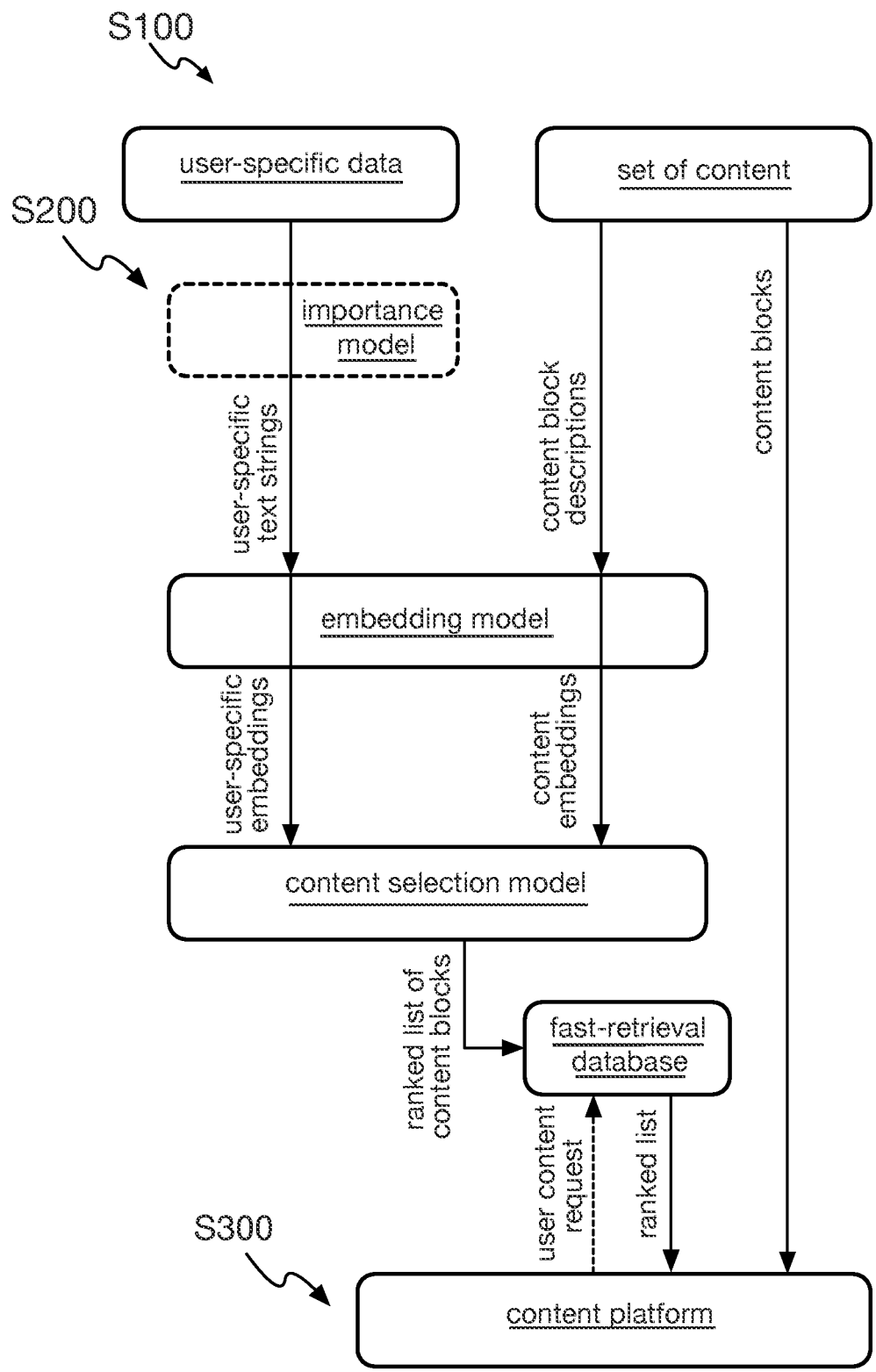
Figure 9A:
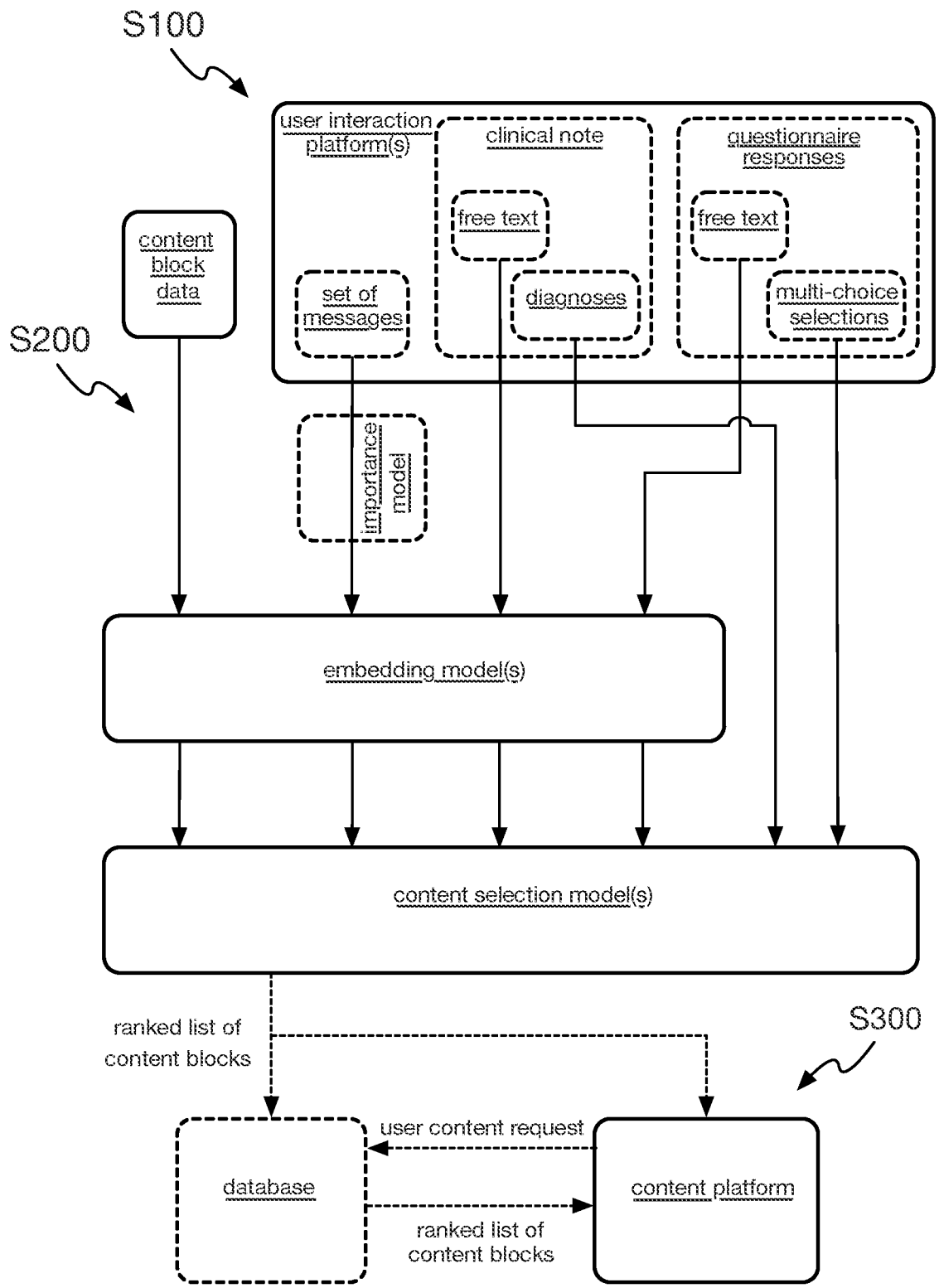
FIGS. 9A-9B are schematic representations of a first and second example, respectively, of a portion of a second embodiment of the system and method.
Figure 9B:
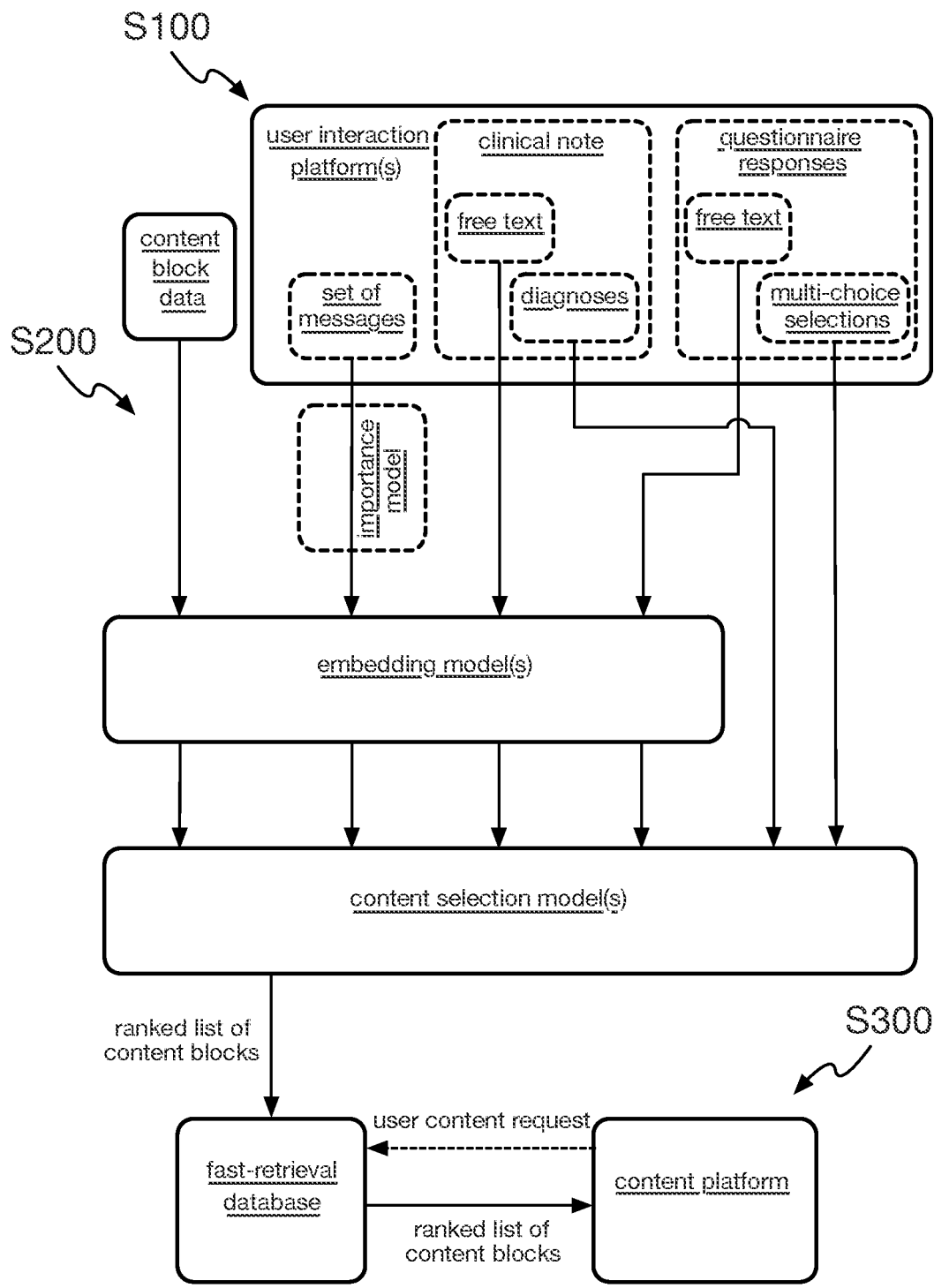

In some embodiments (e.g., as shown in FIGS. 8A-8B), the system includes: an embedding model that accepts user-specific inputs (e.g., user-specific text strings), optionally after filtering via an importance model, to generate user-specific embeddings, and accepts content block data (e.g., content block descriptions) to generate content embeddings; a content selection model that accepts the user-specific embeddings and content embeddings and uses them to generate content recommendations (e.g., a ranked list of content blocks); an optional database (e.g., fast-retrieval database such as a key-value store) configured to store and provide the content recommendations; and a content platform that provides the content recommendations to a user. In some embodiments (e.g., as shown in FIGS. 9A-9B), the system additionally or alternatively includes: an embedding model that accepts a first set of user-specific inputs (e.g., messages, free text portions of clinical notes, etc.), optionally after filtering some or all via an importance model, to generate user-specific embeddings, and accepts content block data (e.g., content block descriptions) to generate content embeddings; one or more content selection models that accept the user-specific embeddings, content embeddings, and/or additional user-specific inputs (e.g., clinical diagnoses, questionnaire responses, etc.), and uses them to generate content recommendations (e.g., a ranked list of content blocks); an optional database (e.g., fast-retrieval database such as a key-value store) configured to store and provide the content recommendations; and a content platform that provides the content recommendations to a user. In some such embodiments, only a subset of user-specific inputs (e.g., only the most recent set of inputs for the user) are used to generate content recommendations. In some such embodiments, the content selection model(s) may apply different selection criteria based on which user-specific inputs are provided and/or are to be used for generating content recommendations. However, the system can additionally or alternatively include any other suitable elements in any suitable arrangement.

The models can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), back-propagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data.

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; in response to determination of an actual result differing from an expected result; and/or with any other suitable timing. Any model can optionally be run or updated concurrently with one or more other models, serially, at varying frequencies, or with any other suitable timing.

The system 100 further preferably includes and/or interfaces with a set of computing and/or processing subsystems that are configured to perform any or all of the processes of the method 200. Additionally or alternatively, the computing and/or processing subsystem(s) can perform any other functions, such as storing the set of models, storing any or all of the set of inputs, and/or performing any other functions.

In a preferred set of variations, the system 100 interfaces with a remote computing subsystem (e.g., cloud-based computing system) in communication with client applications executing the hubs. Additionally or alternatively, the computing system can include local computing subsystems (e.g., at user devices executing the client application), or any combination.

Additionally or alternatively, the system 100 can include any other suitable components and/or combination of components.

4. Method

As shown in FIG. 2, a method 200 for automatically prioritizing content provided to a user includes receiving inputs from a set of users S100 and processing the set of inputs to determine a set of content recommendations S200. Additionally or alternatively, the method 200 can optionally include providing content recommendations to a user S300, training and/or updating a set of models, and/or any other suitable elements. Additionally or alternatively, the method 200 can include and/or interface with any or all of the methods, processes, embodiments, and/or examples as described in any or all of: U.S. application Ser. No. 13/969,349, filed 16 Aug. 2013; U.S. application Ser. No. 14/839,053, filed 28 Aug. 2015; U.S. application Ser. No. 14/839,232, filed 28 Aug. 2015; U.S. application Ser. No. 15/005,923, filed 25 Jan. 2016; U.S. application Ser. No. 15/069,163, filed 14 Mar. 2016; U.S. application Ser. No. 15/265,454, filed 14 Sep. 2016; U.S. application Ser. No. 15/482,995, filed 10 Apr. 2017; and/or U.S. application Ser. No. 18/189,526, filed 24 Mar. 2023; each of which is incorporated in its entirety by this reference, or any other suitable processes performed in any suitable order.

The method 200 functions to dynamically provide personalized content recommendations to users. Additionally or alternatively, the method 200 can function to increase user engagement in a digital platform, prevent user disinterest and/or disengagement and/or stalled progress toward a health goal, increase the number of members which can be handled by (e.g., assigned to) a coach, and/or perform any other functions.

Any or all of the method 200 (e.g., S200 and on) can optionally be performed in response to one or more messaging triggers, such as upon detection that a member has completed a conversation with a coach (e.g., such that new content recommendations can be provided in response to each conversation). The "end" of a conversation can be defined, for instance, based on any or all of: a temporal gap (e.g., 15 minutes, between 5 minutes and 30 minutes, between 10 minutes and 30 minutes, greater than 30 minutes, etc.) between consecutive messages; a threshold amount of time passing (e.g., 15 minutes, between 5 minutes and 30 minutes, between 10 minutes and 30 minutes, greater than 30 minutes, etc.) since a last message was received from a member and/or populates a thread; detecting that a conversation thread has ended based on message content and/or keywords (e.g., "bye," "talk to you later," "thanks for the help," etc.); detecting that a user has logged out of the platform; and/or any combination of metrics.

Any or all of the method 200 (e.g., S200 and on) can optionally additionally or alternatively be performed in response to detecting that a minimum number of messages and/or words have been exchanged in a conversation, which can function, for instance, to ensure that content recommendations are provided for relevant conversations. For instance, if a conversation with less than a predetermined number of messages and/or with only short messages and/or with messages not relevant to a user's health state (e.g., "Happy Birthday!") occurs, any or all of the method 200 can optionally not be triggered.

Any or all of the method 200 (e.g., S200 and on) can optionally additionally or alternatively be performed in response to availability of information (e.g., user-specific information) for use in performing the method. In examples, this availability can be determined based on completion of a survey, locking of a clinical note, and/or any other suitable indicia of information availability.

Additionally or alternatively, the method 200 can be performed at any other times (e.g., at a predetermined frequency) and/or in response to any other triggers (e.g., in response to a request from a user).

4.1 Method—Receiving Inputs From a Set of Users S100

The method 200 preferably includes receiving inputs from a set of users S100, which functions to receive information with which to perform any or all other processes of the method 200. S100 further preferably functions to receive inputs with which to evaluate with a set of one or more models (e.g., as described below) in order to produce a set of automated content recommendations. S100 can additionally or alternatively function to perform any other functions.

The set of inputs are preferably received at a computing system (e.g., remote computing system, platform, system 100, etc.) or set of computing systems (e.g., multiple computers), such as from one or more user interfaces (e.g., via a client application), but can additionally or alternatively be received from any other suitable sources.

The set of inputs preferably includes a set of messages provided within the messaging thread being analyzed, but can additionally or alternatively includes messages from other threads (e.g., with the same member, with the same coach, with a different coach and/or member, etc.), non-message inputs (e.g., coach preferences, member preferences, member information, etc.), and/or any other inputs or combination of inputs.

The messages can be from any user in the thread, such as a coach, member, and/or any other user or combination of users.

In a set of preferred variations, the set of messages exchanged in each conversation associated with a particular member is received in S100 (e.g., in real time and/or in substantially real time relative to when the message was provided, in a batched fashion such as when the conversation is deemed to have ended, etc.) and used to determine which content should be provided to the user (e.g., the next time he or she opens and/or logs into an application, immediately, the next time he or she requests content, etc.).

Figure 4:
FIG. 4 depicts an illustrative example of a questionnaire provided to a user.

The set of inputs can optionally additionally or alternatively include answers provided by members to a set of questionnaires (e.g., as shown in FIG. 4). The questionnaires preferably include an onboarding questionnaire, which functions to assess an initial state of the user, but can additionally or alternatively include routine and/or multiple questionnaires (e.g., routine surveys administered at a predetermined frequency).

The set of inputs can optionally additionally or alternatively include notes provided by coaches, clinicians, and/or other members of a care team. In some examples, such as examples in which a member interacts with a clinician (or other care team member such as a coach) using a non-text medium (e.g., audio or video call), the clinician may write a clinical note summarizing important information regarding the member (e.g., information from the interaction and/or previous interactions; clinician findings based on the interaction, previous interactions, and/or other information; diagnoses associated with the patient such as new diagnoses determined based on the interaction and/or preexisting diagnoses; possible diagnoses such as diagnoses under consideration by the clinician based on the interaction, previous interactions, and/or other information; etc.); analogously, a coach may prepare a coaching note based on text-based messaging and/or non-text interactions with the member, and/or any other suitable members of the care team may prepare notes associated with the member. In such examples, the clinical note (and/or other note) may be used to generate content recommendations for the user.

In a set of preferred variations, the responses provided by a member to a questionnaire (e.g., onboarding questionnaire responses provided before the member has message exchanges with a coach, updated questionnaire responses provided after the member has had at least one message exchange with a coach, clinical survey completed in the context of clinical care provided to the member, etc.) and/or one or more clinical notes are used to recommend content (e.g., an initial set of content, an updated set of content, etc.) for the member.

In a set of examples, once the member has a first conversation with a coach, that conversation is used to recommend a new set of content or portion of content (e.g., aggregated with the onboarding questionnaire content).

In another set of examples, for members who do not engage in conversations with coaches (e.g., members enrolled in a digital program package which excludes coach conversations, members who elect to not converse with coaches, etc.), questionnaire information can be a primary source of information for content selection.

In another set of examples, more recent information is prioritized in generating content recommendations. In some such examples, only the most recent inputs (e.g., the most recent questionnaire responses, message exchange, or clinical note) may be used in generating content recommendations. For example, a member may first provide responses to a questionnaire, and receive content recommendations based on those responses; the member may then have a message exchange with a coach, and receive content recommendations based on that message exchange; the member may then have an interaction with a clinician resulting in a clinical note, and receive content recommendations based on that clinical note; the member may then provide updated responses to a questionnaire, and receive content recommendations based on those updated responses; and so on, wherein only the most recent inputs are used to provide content recommendations.

Additionally or alternatively, the set of inputs can include any other information.

4.2 Method—Processing the Set of Inputs to Determine a Set of Content Recommendations S200

The method 200 preferably includes processing the set of inputs to determine a set of content recommendations S200, which functions to provide personalized, optimal content recommendations to user, such as a content which reflects any or all of: his or her current state (e.g., health state, mental health state, etc.), recent progress toward a goal, recent setbacks toward a goal, a change in state, a current and/or pressing need, a predicted metric (e.g., predicted need, predicted goal, etc.), and/or content which reflects any other information.

Additionally or alternatively, S200 can function to spur exploration of the member (e.g., through inclusion of random content), increase user happiness and/or satisfaction with a digital program, increase user progress toward a goal, reduce coach time on recommending and/or providing content, increase a therapeutic alliance between the participant and a coach, and/or can perform any other functions.

S200 is preferably performed in response to and based on any or all of the information received in S100, but can additionally or alternatively be performed at any other times (e.g., in response to a trigger and/or request, at a predetermined frequency, etc.) and/or based on any other information. Additionally or alternatively, the types and/or temporal parameters associated with the information received in S100 can be used to inform how S200 is performed (e.g., which information is processed). In some variations, for instance, in an event that multiple types of information are received in S100 (e.g., answers to a questionnaire as well as conversational messages, messages from multiple conversations, etc.), S200 can be performed based on: the most recently received type of information (e.g., messages from a most recent conversation), a pre-prioritized type of information (e.g., perform S200 based only on conversational information if available, etc.), aggregated information (e.g., aggregated messages from multiple conversations; aggregation of messages, questionnaire responses, and/or clinical notes; etc.), and/or any other information. In a first example, S200 is performed based only on the most recent information received (e.g., the most recent questionnaire responses, message exchange, or clinical note), such that the resulting content recommendations are generated based only on the most recent salient information regarding a member. In a second example, S200 is performed based only on information received within a threshold time period (e.g., threshold time before the present), such that all information (or any suitable subset thereof) received within the threshold time may be used, but no information received before the threshold time will be used; the threshold time period can be the same or different for different data types (e.g., wherein questionnaire responses persist longer than messages), and/or only some data types may be subject to the time period cutoff (e.g., wherein clinical diagnoses may be used indefinitely unless overridden by a clinician, regardless of the age of the diagnosis).

In some variations, S200 is performed in response to a trigger associated with a conversation (e.g., exchange of messages) (e.g., as shown in FIG. 5), such as a determination that a conversation has taken place, that a conversation has ended, that a conversation is taking place, that a message (or set of messages) have been transmitted or received, and/or any other triggers.

In a first set of examples, S200 is performed after every conversation has taken place and optionally only when the conversations satisfies a set of inclusion criteria, such as, but not limited to: a minimum number of messages in the conversation (e.g., 15 messages, between 5-25 messages, etc.), which can further, for instance, to increase the relevance of the recommended content; a maximum number of messages in the conversation (e.g., wherein if the number of messages exceeds a threshold, the conversation is split into multiple conversations); a minimum time spent messaging by the member and/or a coach; a minimum length of messages in the conversation; and/or any other criteria. In some examples, for instance, a requirement for at least a minimum number of messages (e.g., 15, 20, 25, 30, between 10-40, etc.) is enforced, as in some instances, longer conversations have been discovered by the inventors to spur more relevant recommendations for the participant.

In a second set of examples (e.g., in which S200 functions to generate real-time or near-real-time content recommendations for a member and provide these recommendations to a coach engaged in messaging with the member, wherein the coach may choose to provide some or all such recommendations to the member during and/or after the message exchange session), S200 is performed after each message (or a threshold number of messages, such as 2, 3, 4, 5, etc.) is transmitted or received (e.g., wherein content recommendations are generated and updated in response to transmission or receipt of each new message or group of messages). In some examples, importance classification may be performed on each message (e.g., in response to message transmission or receipt), and content recommendations may only be generated and/or updated in response to classification of one or more messages as important (e.g., in response to transmission or receipt, and subsequent classification as important, of a message or threshold number of messages).

S200 can optionally include pre-processing any or all of the set of inputs received in S100, which can function to prepare the inputs for further processing, enable a more efficient performance of future processes of the method 200, and/or perform any other functions.

Pre-processing the set of inputs can optionally include representing any or all of the inputs in a quantitative format, which can enable: comparison of the inputs with each other, determinations of similarity between the inputs and the content options, and/or can be used in any other way(s).

In a preferred set of variations, for instance, representing the inputs in a quantitative format includes generating a set of embeddings for any or all of the set of inputs, wherein the embeddings function to represent each of the set of inputs (e.g., each message) with a numerical array (e.g., vector, matrix, etc.) which quantifies the message or other input (e.g., questionnaire response). The embedding pre-processing can be performed by the embedding model and/or by any other suitable model(s). In examples, the embedding pre-processing can be performed with a natural language model (e.g., for multiple languages), preferably with a machine learning (e.g., deep learning) natural language embeddings model, but can additionally or alternatively be performed with any other suitable models, algorithms, and/or tools.

Pre-processing the set of inputs can additionally or alternatively include non-embedding pre-processing, such as: correcting spelling and/or grammar errors contained in the inputs, de-identifying user data (e.g., removing PII), generalizing the inputs, threat detection, and/or any other processes. Preferably, non-embedding pre-processing occurs prior to generating the set of embeddings, but can additionally or alternatively occur after generating the set of embeddings and/or with any other suitable timing. In examples, threat detection can include analyzing inputs for specific sets of words to detect any perceived threats to the safety of the user and/or others. Optionally, a detected threat can trigger an alert to the care team, and/or trigger other de-escalation processes. In an example, the method can incorporate any of the methods for threat detection and/or escalation as described in U.S. patent application Ser. No. 17/752,097 filed 24 May 2022, which is incorporated herein in its entirety by this reference.

Pre-processing the set of inputs (e.g., conversational inputs) can optionally additionally or alternatively include identifying a subset of high/highest importance and/or high/highest relevance inputs for further processing, which functions to enable the content recommendations to reflect the most important and/or relevant information.

In a preferred set of variations, such as for instances of S200 in which messages from a conversation are being processed, pre-processing the set of inputs preferably includes determining which messages within the conversation are deemed important, wherein those that are not deemed important are excluded from further processing. This can function to: enable the most relevant content to be recommended to the member, reduce false positives and/or irrelevant recommendations when providing content to the member (e.g., ignoring messages that may have high overlap with content card text but low levels of importance in a session), and/or perform any other functions.

Additionally or alternatively, the inputs of highest importance can be used to determine a prioritized order of content recommendations, inform processing of the other inputs, filter out unimportant messages, and/or be used in any other way(s).

Identifying an important subset of messages is preferably performed with a classifier or set of classifiers (e.g., machine learning classifier, trained classifier, etc.), which predict the importance of each message, but can additionally or alternatively be performed with any other models, algorithms, tools, or combination of tools.

Figure 7:
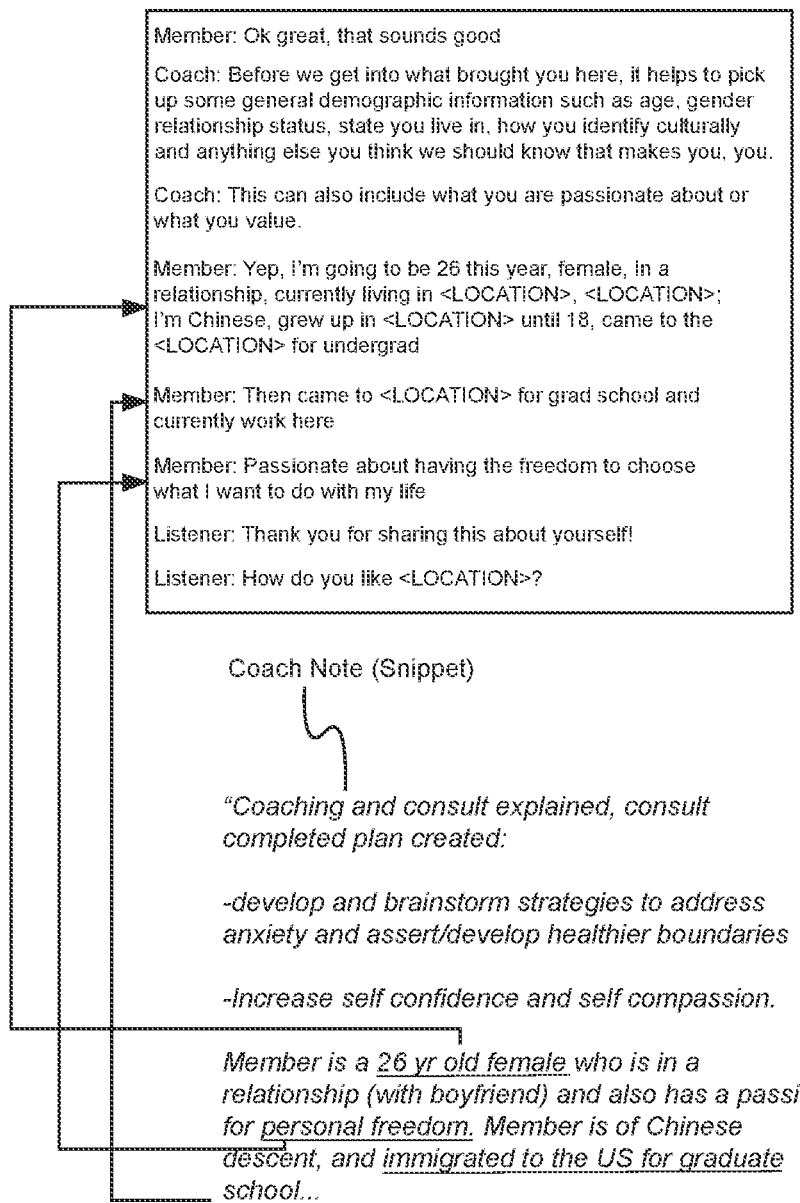
FIG. 7 depicts an example of data used in training a classifier.

In a preferred set of variations, for instance, the classifier is determined based on (e.g., trained with) data which includes messages from a conversation along with a set of coach notes corresponding to that conversational session (e.g., as shown in FIG. 7). With this data, messages were determined to be important/relevant (e.g., labeled as important) if they overlapped with and/or had similarities with (e.g., based on embedding comparisons, using text similarity methods such as cosine distance among others, etc.) what the coach had noted (e.g., sentences written by the coach) in the coach notes. If a message in the conversation and/or its semantic meaning, for instance, was included in (e.g., in a paraphrased fashion, copied and pasted in, had semantic similarity with through an embedding comparison, etc.) the coach notes, it was labeled as important in the training data. As such, the classifier is able to, based on this data, classify the importance of new messages and/or any other inputs.

Additionally or alternatively, the inputs can be pre-processed in any other suitable way(s) and/or not pre-processed.

S200 preferably includes comparing any or all of the set of inputs (e.g., embeddings for most important messages, for all messages from a conversation classified as important, for all messages of a conversation without regard to importance; embeddings for each line or sentence of a coach note or clinical note, or any suitable subset of the lines or sentences thereof; embeddings for each questionnaire response or any suitable subset thereof, etc.) with the set of available content options in order to determine which pieces of content are most similar to the inputs, which functions to information which content to recommend to the member in S300. Additionally or alternatively, any or all of the inputs can be compared with each other, and/or the inputs can be otherwise suitably processed.

The comparisons preferably result in a set of similarity metrics, where the similarity metrics are used in selecting the content to recommend to the member. The similarity metrics are preferably calculated with embeddings (e.g., as described above) or other quantitative representations of the set of inputs such that a mathematical operation which assesses the similarity between inputs and potential content can be calculated and optionally compared with other similarity metrics (e.g., to determine the highest similarity content). Additionally or alternatively, similarity can be assessed without embeddings or other quantitative representations (e.g., with a trained machine learning model for natural language processing), and/or any other metrics and/or assessments can be used to determine which content to provide to the member.

In a preferred set of variations, embeddings of each of the set of inputs and/or each of the set of pre-processed inputs (e.g., only high importance messages) are compared with embeddings corresponding to each of a set of available pieces of content (e.g., all pieces of content, all pieces of content available to a particular member such as based on their progress level and/or goal type and/or package type, titles of each piece content, individual sentences of each piece of content, sentence summaries describing each piece of content, etc.), wherein a subset of content is selected based on the calculated similarity metrics (e.g., predetermined number of pieces of content having the highest similarity scores) and any number of criteria.

Figure 6A:
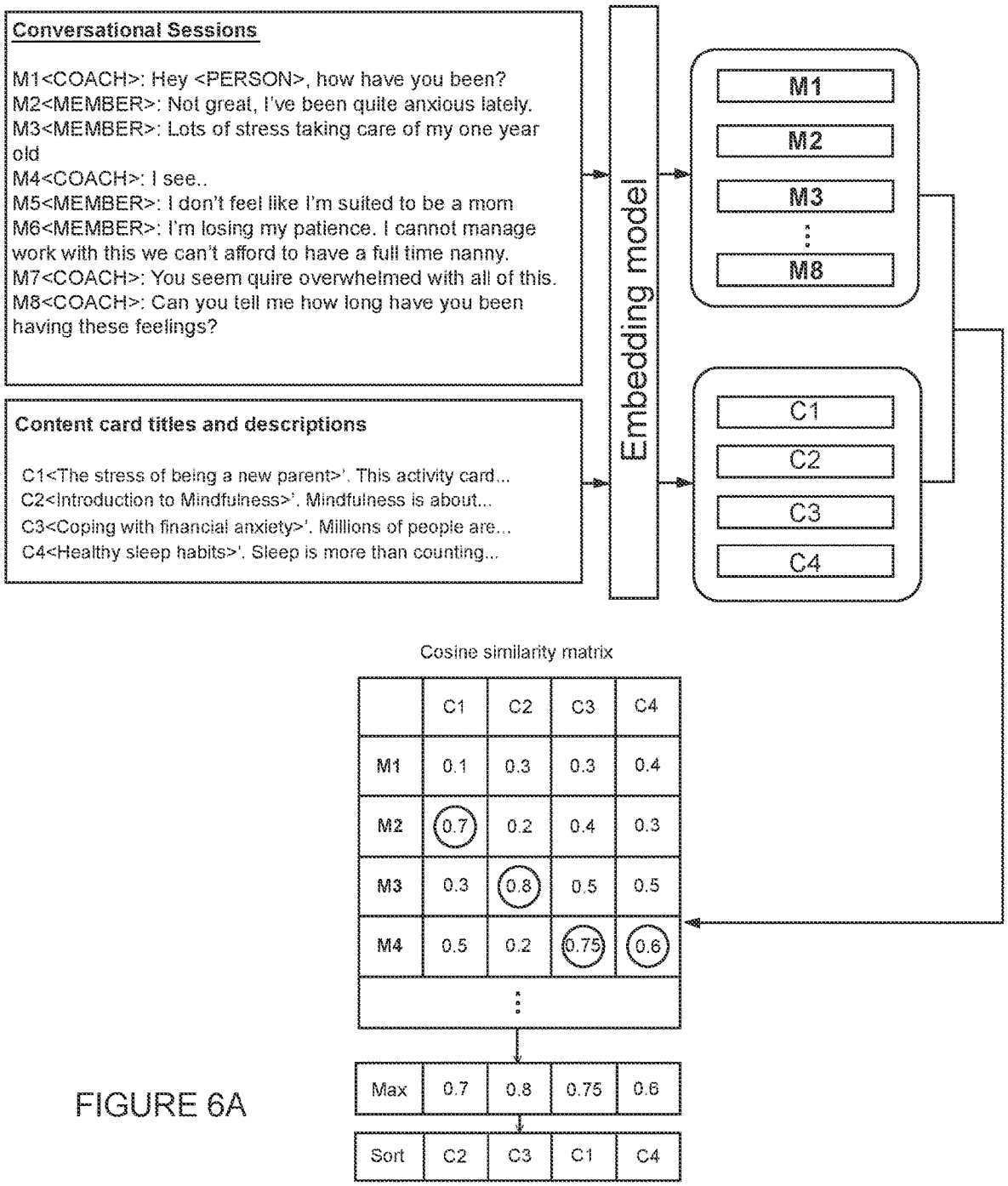
FIGS. 6A-6B depict a first and second illustrative example, respectively, of a portion of a method for automatically prioritizing content provided to a user.
Figure 6B:
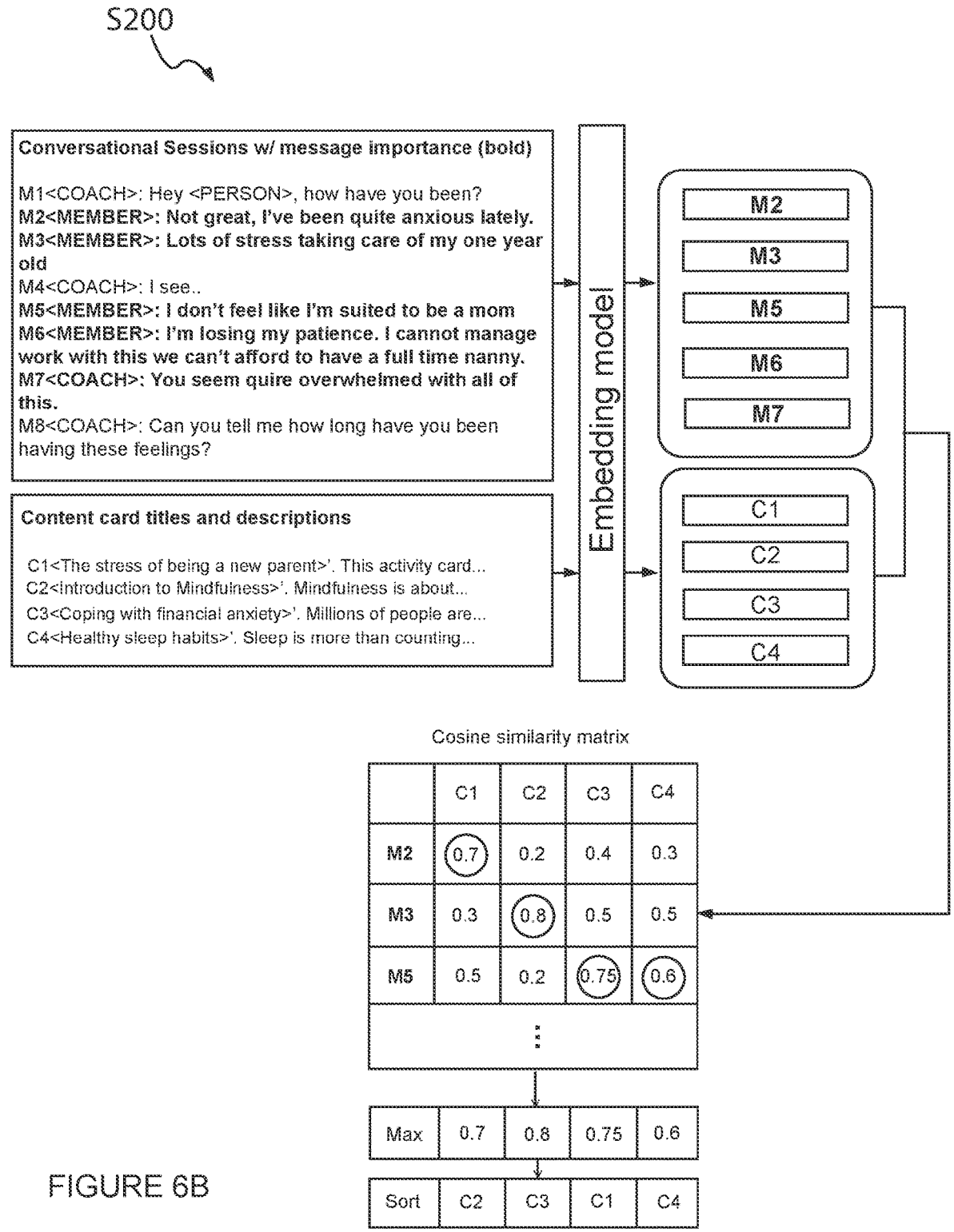

In a set of examples (e.g., as shown in FIGS. 6A-6B), for instance, a cosine similarity (equivalently referred to herein as a semantic similarity) is calculated for each of the N messages in a conversation (e.g., as shown in FIG. 6A), or alternatively for each of the N' messages in the conversation that are classified as important (e.g., as shown in FIG. 6B), and with respect to each of a set of M content cards, to yield an M×N matrix (or M×N' matrix) of similarity metrics. These similarity metric values can then be compared, assessed, and/or otherwise processed in order to determine which content to provide and/or in which order to provide content to the member in S300.

In a first particular example (e.g., as shown in FIGS. 6A-6B), a highest similarity value for each content card is determined (as shown in the highest value being found for each column in the matrix of FIG. 6A or FIG. 6B), where the content cards are presented to the member (e.g., in a scrolling fashion, with time delays, etc.) in an order from the highest metric to the lowest metric. Additionally, a cutoff and/or threshold can further be applied based on these metrics, such that, for instance, only a predetermined number of top content is presented to the member, only content which has a metric exceeding a predetermined threshold is presented to the member, and/or the content can be otherwise selected/presented.

In a second particular example, the similarity metrics for each piece of content are aggregated (e.g., summed over each column in FIG. 6A or FIG. 6B, averaged over each column in FIG. 6A or FIG. 6B, etc.), and this aggregated value is used to select content and/or order the content.

In a third particular example, a highest similarity metric is found for each content card (e.g., highest value in each column in FIG. 6A or FIG. 6B, such as indicated by the circled values therein), where a content card can be recommended which has the highest similarity with any of the messages, which has the highest average similarity with all messages, and/or any other content can be recommended.

Additionally or alternatively, the similarity between the inputs and the content can be otherwise determined and/or used to select content and/or determine the way in which (e.g., order, temporal spacing, etc.) content is provided to the member.

In variations in which questionnaire answers and/or other non-message inputs are used to select content, similarity metrics can additionally or alternatively be calculated between embeddings of the questionnaire answers and the pieces of content to select content for the members. In a set of examples, the answers (e.g., multiple choice answers) provided by the member are formed into a vector (e.g., through annotations from subject matter experts), which is then pre-processed to determine an embedding, wherein the answer embedding is compared with embeddings manually determined for each of the pieces of content. Additionally or alternatively, any or all of the content embeddings can be automatically determined (e.g., with a trained model), and/or otherwise suitably determined.

In variations in which clinical notes (and/or other information that may be indicative of clinical diagnoses) are used to select content, diagnosis information (e.g., information representative of a specific clinical diagnosis, such as specific disorder names and/or diagnosis codes, which may include disorders such as "anxiety disorder", "substance abuse", "depression", "attention deficit hyperactivity disorder", etc.) can optionally be segregated from other portions of the clinical note (e.g., free text notes), wherein the diagnosis information and the other portions may be used in different manners to generate content recommendations (or only one may be used to generate content recommendations). For example, each specific diagnosis may be associated with a fixed set of content blocks to recommend (e.g., in a ranked list, in a pool, etc.), such as a fixed set predetermined by one or more clinicians and/or other members of the care team, whereas free text portions of the clinical note may optionally be used to generate user-specific embeddings (e.g., analogous to the embeddings generated based on messages between a member and coach). In one such example, content block recommendations associated with specific diagnoses may be prioritized over other content block recommendations (e.g., recommendations that are dynamically generated, such as based on embedding similarity). In a first specific example, in which a clinical note includes information representative of a single diagnosis, the first entries of the ranked list of content block recommendations are occupied by the entire set of content blocks associated with the diagnosis, optionally followed by content blocks determined using a free text entry of the clinical note (e.g., based on embedding similarity between lines/sentences of the free text entry and the content blocks). In a second specific example, in which a clinical note includes information representative of two diagnoses, the first entries of the ranked list of content block recommendations are occupied by the entire set of content blocks associated with the two diagnoses (e.g., wherein blocks from the two sets are interleaved, wherein blocks of a primary diagnosis precede blocks of a secondary diagnosis, etc.), optionally followed by content blocks determined using a free text entry of the clinical note (e.g., based on embedding similarity between lines/sentences of the free text entry and the content blocks). Additionally or alternatively, one or more diagnoses (or the absence thereof) may be used to filter out inappropriate content for a particular user (e.g., such that the filtered out content will not be presented to the user, even if the content would otherwise have a high ranking for display). In a first specific example, content that is specific to bipolar disorder may be filtered out for all members except those who have received a bipolar disorder diagnosis (e.g., wherein a clinical note associated with the member includes information representative of a bipolar disorder diagnosis). In a second specific example, content that may be problematic in the context of a particular diagnosis may be filtered out for members who have received that particular diagnosis (e.g., wherein a clinical note associated with the member includes information representative of the particular diagnosis). However, the clinical note(s) can additionally or alternatively be used to generate content recommendations in any other suitable manner.

S200 can optionally include adjusting any or all of the content recommendations, which can function, for instance, to further refine the content recommendations to the member (e.g., based on member-specific factors, based on a history of previously recommended content to the member to prevent duplicate recommendations, etc.), to keep a large variety of content in circulation, to prevent redundancy in the content which is provided to the member, and/or can perform any other functions.

In a set of preferred variations, for instance, the content recommendations made based on similarity metrics are adjusted to include random content recommendations (e.g., selected with a randomized process), which can function to keep all content in circulation and/or otherwise confer benefits. In a set of examples, for instance, random content is inserted at predetermined intervals within the prioritized list of content (e.g., at every $3^{rd}$ content card). The random content can further be refined such that it is within a same category (e.g., depression, exercise, etc.) as the card it is replacing and/or otherwise related to other content.

Additionally or alternatively, the content recommendations can be adjusted to include content which is least frequently recommended and/or any other content.

Additionally or alternatively, S200 can include any other processes.

In one variation of S200, when a member has a conversation with a coach within a predetermined time threshold (e.g., the past 60 days) and that conversation has at least a minimum number of messages (e.g., greater than 15 messages), the member receives conversation-based recommendations, whereas if not, the application defaults to onboarding-questionnaire-based recommendations. In an event that the questionnaire answers have not been provided and/or the answers are not information (e.g., answered "other" or "N/A" for all questions), the application can default to random recommendations.

4.3 Method—Providing the Set of Content Recommendations to a User S300

The method 200 can include providing the set of content recommendations to a user S300, which functions to present and/or otherwise enable the recommended content to be available to the member, such that the member can view, interact with, and/or otherwise engage with the content recommendations.

S300 is preferably performed in response to receiving a user content request (e.g., receiving a content request from and/or for a member), such as in response to a user interacting with the application and/or the content platform (e.g., opening the application, providing a refresh request to the application and/or to the content platform thereof, etc.). However, S300 can additionally or alternatively be performed in response to performing S200 (e.g., performed in response to completion of S200, such as in real-time or near-real-time following completion of S200 for a particular set of inputs) and/or at any other suitable times (e.g., in response to a trigger, at a predetermined frequency, etc.).

In one set of variations, which can have the benefit, for instance, of minimizing a computational cost to the system and/or of reducing latency for the user, the recommendations determined in S200 are automatically generated in response to one or more information availability triggers (e.g., when a conversation is completed; when a message is sent or received; after a threshold time period in which one or more messages are sent or received, such as after a period of 5, 10, 15, 20, 30, or 60 seconds, etc., during which messaging activity occurs; etc.), and cached in a fast retrieval database (e.g., key-value store), such that when the member next opens the application, it refreshes to include the newest recommendations.

The content is preferably provided through an application associated with the digital program, but can additionally or alternatively be otherwise provided to the member (e.g., through an emailed list).

In a preferred set of variations, S300 includes re-ordering the content normally available to the member according to a prioritized order determined in S200 (e.g., wherein the member can scroll through the content in the prioritized order).

Additionally or alternatively, S300 can include providing new content to the member (e.g., enabling the member to access new recommended content), removing member access to content (e.g., content which is not recommended and/or is associated with a priority level below a predetermined threshold), and/or otherwise adjusting content.

Additionally or alternatively, S300 can include providing content recommendations to a coach (e.g., coach engaged in messaging with the member), preferably in real-time or near-real-time, wherein the coach may choose to provide some or all such recommendations to the member during and/or after the message exchange session. In some examples (e.g., in which S200 includes generating and/or updating recommendations during a message exchange session, such as based on a single message or a small number of messages), S300 can include providing the coach with the content, a link to the content, an excerpt of the content, and/or any other suitable information associated with the recommended content, wherein the coach may choose to provide the content (and/or associated information) to the member; additionally or alternatively, S300 can include providing the content (and/or associated information) directly to the member (e.g., during the message exchange session, such as in real-time or near-real-time; as part of the message exchange session or separate from the message exchange session; etc.). In some examples, the content recommendations can be provided in accordance with U.S. application Ser. No. 18/189,526, filed 24 Mar. 2023 and titled "METHOD AND SYSTEM FOR AUTOMATICALLY DETERMINING RESPONSES IN A MESSAGING PLATFORM", which is herein incorporated in its entirety by this reference; for example, recommended content (and/or links to content, content excerpts, etc.) can be provided to the coach as part or all of a recommended message (e.g., wherein the message may further include a description of why the recommended content is relevant to the member, instructions for how or when to consume the content, etc.) to be sent to the user as described in U.S. application Ser. No. 18/189,526.

However, S300 can additionally or alternatively include providing content recommendations in any other suitable manner.

4.4 Method—Optional Processes

The method 200 can additionally or alternatively include any number of other processes performed in any suitable order.

In some variations, for instance, the method 200 includes any or all of: training any or all of a set of models and/or algorithms (e.g., training the importance, training the embeddings determination model, etc.); updating (e.g., retraining) any or all of the set of models (e.g., based on which responses are selected by the user); updating the corpus of messages (e.g., to include selected response options, to include additional manually generated responses, etc.); and/or any other processes.

Additionally or alternatively, the method 200 can include any other suitable processes.

The method (and/or any suitable portions thereof) can be performed in real time (e.g., responsive to a request), iteratively, concurrently, asynchronously, periodically, and/or with any other suitable timing. The method (and/or any suitable portions thereof) can be performed automatically, manually, semi-automatically, and/or in any other suitable manner.

All or portions of the method can be performed by one or more components of the system, using a computing system, using a database (e.g., a system database, a third-party database, etc.), by a user, and/or by any other suitable system. The computing system can include one or more: CPUs, GPUs, custom FPGA/ASICS, microprocessors, servers, cloud computing, and/or any other suitable components. The computing system can be local, remote, distributed, or otherwise arranged relative to any other system or module.

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein (and/or any suitable subsets thereof) can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method for interpreting user-specific text using a model for natural language processing and optimally personalizing content, comprising:
 receiving a plurality of user-specific text strings associated with a user;
 using the model for natural language processing, the model comprising a trained semantic embedding model, generating a set of user-specific embeddings, comprising, for each user-specific text string of the plurality: generating a respective user-specific embedding based on the user-specific text string, wherein the respective user-specific embedding preserves semantic language information from the user-specific text string;
 generating a set of content embeddings, comprising, for each content block of a set of content blocks, generating a respective content embedding associated with the content block;
 based on a set of semantic similarity metrics determined between the set of user-specific embeddings and the set of content embeddings, determining a ranked list of content blocks selected from the set of content blocks, wherein determining the ranked list is performed in response to receiving the set of user-specific embeddings;
 in response to determining the ranked list, storing the ranked list in a database;
 after storing the ranked list, receiving a content request from the user;
 in response to receiving the content request, retrieving the ranked list and selecting the at least one content block based on the ranked list;
 adjusting the ranked list to exclude a content block previously provided to the user;
 based on the ranked list, providing at least one content block to the user, wherein providing the at least one content block to the user is performed in response to selecting the at least one content block;
 after providing the at least one content block to the user:
 receiving a second plurality of user-specific text strings associated with the user;
 using the trained semantic embedding model, generating a second set of user-specific embeddings, comprising, for each user-specific text string of the second plurality: generating a respective user-specific embedding based on the user-specific text string;
 based on the second set of user-specific embeddings and a second set of content embeddings, determining a second ranked list of content blocks selected from the set of content blocks;
 in response to determining the second ranked list, storing the second ranked list;
 after storing the second ranked list, receiving a second content request from the user;
 in response to receiving the second content request:
 retrieving the second ranked list;
 selecting a second content block based on the second ranked list; and
 providing the second content block to the user.

2. The method of claim 1, wherein:
 the set of user-specific embeddings are defined in an embedding space; and
 the set of content embeddings are defined in the embedding space.

3. The method of claim 2, wherein generating the set of content embeddings is performed using the trained semantic embedding model.

4. The method of claim 3, wherein the trained semantic embedding model comprises a multi-lingual semantic embedding model.

5. The method of claim 2, wherein determining the ranked list comprises:

for each content embedding of the set of content embeddings:
- determining a respective set of similarity metrics, wherein the set of semantic similarity metrics comprises the respective set of similarity metrics, wherein each similarity metric is indicative of similarity of the content embedding to a respective user-specific embedding of the set of user-specific embeddings; and
- determining an overall relevance metric associated with the content embedding; and ranking the content embeddings of the set based on the overall relevance metrics.

6. The method of claim 5, wherein each similarity metric is determined based on a cosine similarity between a content embedding and a user-specific embedding.

7. The method of claim 5, wherein, for each content embedding of the set: determining the overall relevance metric comprises selecting the highest similarity metric of the respective set of similarity metrics.

8. The method of claim 1, further comprising generating the second set of content embeddings, comprising, for each content block of a second set of content blocks, generating a respective content embedding associated with the content block.

9. The method of claim 1, wherein the second set of content embeddings is equivalent to the set of content embeddings.

10. The method of claim 1, wherein:
receiving the plurality of user-specific text strings comprises:
- receiving a set of messages of a first conversational session with the user; and
- selecting the plurality of user-specific text strings from the set of messages; and receiving the second plurality of user-specific text strings comprises:
- receiving a summary of a second conversational session with the user; and
- selecting the second plurality of user-specific text strings from the summary.

11. The method of claim 1, wherein receiving the plurality of user-specific text strings comprises:
- receiving a summary of a conversational session with the user; and
- selecting a set of user-specific text strings from the summary, wherein the plurality of user-specific text strings comprises the selected set of user-specific text strings.

12. The method of claim 1, wherein receiving the plurality of user-specific text strings comprises:
- receiving a set of messages of a conversational session with the user; and
- selecting a set of user-specific text strings from the set of messages, wherein the plurality of user-specific text strings comprises the selected set of user-specific text strings.

13. The method of claim 12, wherein selecting the set of user-specific text strings from the set of messages comprises, using a trained importance model, selecting a subset of messages from the set of messages, wherein each user-specific text string comprises a different message of the subset.

14. The method of claim 1, wherein providing the at least one content block to the user comprises:
- selecting a plurality of content blocks from the ranked list; and
- displaying the plurality of content blocks to the user in order of ranking in the ranked list.

\* \* \* \* \*